United States Patent
Kim et al.

(10) Patent No.: US 10,084,523 B2
(45) Date of Patent: Sep. 25, 2018

(54) METHOD AND APPARATUS FOR TRANSMITTING AND RECEIVING CHANNEL STATE INFORMATION IN A WIRELESS COMMUNICATION SYSTEM

(71) Applicant: Samsung Electronics Co., Ltd., Gyeonggi-do (KR)

(72) Inventors: Younsun Kim, Gyeonggi-do (KR); Hyojin Lee, Gyeonggi-do (KR); Hyoungju Ji, Seoul (KR); Juho Lee, Gyeonggi-do (KR); Joonyoung Cho, Gyeonggi-do (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/032,511

(22) Filed: Sep. 20, 2013

(65) Prior Publication Data
US 2014/0079100 A1 Mar. 20, 2014

(30) Foreign Application Priority Data

Sep. 20, 2012 (KR) ............... 10-2012-0104790
Sep. 21, 2012 (KR) ............... 10-2012-0105264

(51) Int. Cl.
*H04K 1/10* (2006.01)
*H04B 7/06* (2006.01)
(Continued)

(52) U.S. Cl.
CPC ......... *H04B 7/0626* (2013.01); *H04B 7/0417* (2013.01); *H04B 7/0469* (2013.01); *H04B 7/0632* (2013.01); *H04B 7/0639* (2013.01)

(58) Field of Classification Search
CPC .... H04W 24/06; H04L 5/0023; H04L 5/0057; H04L 5/0048
(Continued)

(56) References Cited

U.S. PATENT DOCUMENTS

2005/0157805 A1 7/2005 Walton et al.
2009/0190528 A1* 7/2009 Chung ............... H04B 7/0417
370/328
(Continued)

FOREIGN PATENT DOCUMENTS

CN 102237969 11/2011
GN 102291210 12/2011
(Continued)

OTHER PUBLICATIONS

Samsung, CSI Feedback Mechanism for Multiple Transmission Points, R1-114224, 3GPP TSG RAN WG1 #67, Nov. 14-18, 2011.
(Continued)

*Primary Examiner* — Helene Tayong
(74) *Attorney, Agent, or Firm* — The Farrell Law Firm, P.C.

(57) ABSTRACT

A method and apparatus for transmitting and receiving CSI is provided for use in a wireless communication system using a plurality of antennas. The CSI transmission method of a terminal includes receiving a first CSI-RS and a second CSI-RS, transmitting a CSI indicator indicating one of the first and second CSI-RS corresponding to CSI to be transmitted, and transmitting the CSI generated based on the CSI indicator, until transmission of a new CSI indicator.

15 Claims, 19 Drawing Sheets

(51) Int. Cl.
*H04B 7/0417* (2017.01)
*H04B 7/0456* (2017.01)

(58) Field of Classification Search
USPC .................. 375/260, 259; 370/255, 252, 329
See application file for complete search history.

(56) References Cited

U.S. PATENT DOCUMENTS

| | | | |
|---|---|---|---|
| 2011/0009148 A1* | 1/2011 | Kotecha | H04B 7/063 |
| | | | 455/513 |
| 2011/0235743 A1* | 9/2011 | Lee | H04L 5/0048 |
| | | | 375/295 |
| 2011/0268073 A1 | 11/2011 | Jian et al. | |
| 2012/0076028 A1 | 3/2012 | Ko et al. | |
| 2012/0076040 A1* | 3/2012 | Hoshino | H04W 24/10 |
| | | | 370/252 |
| 2012/0147766 A1 | 6/2012 | Kim et al. | |
| 2012/0176939 A1* | 7/2012 | Qu et al. | 370/255 |
| 2012/0176996 A1* | 7/2012 | Kim | H04W 72/0413 |
| | | | 370/329 |
| 2012/0219042 A1 | 8/2012 | Onggosanusi et al. | |
| 2012/0257531 A1 | 10/2012 | Ko et al. | |
| 2012/0287799 A1* | 11/2012 | Chen | H04B 7/024 |
| | | | 370/252 |
| 2012/0322477 A1 | 12/2012 | Kang et al. | |
| 2013/0021926 A1* | 1/2013 | Geirhofer | H04L 5/0048 |
| | | | 370/252 |
| 2013/0028109 A1* | 1/2013 | Jongren | H04W 24/10 |
| | | | 370/252 |
| 2013/0039203 A1 | 2/2013 | Fong et al. | |
| 2013/0286964 A1* | 10/2013 | Chu | H04L 27/261 |
| | | | 370/329 |
| 2014/0003240 A1* | 1/2014 | Chen | H04W 28/08 |
| | | | 370/235 |
| 2014/0056156 A1* | 2/2014 | Jongren | H04L 1/0026 |
| | | | 370/252 |
| 2014/0185543 A1* | 7/2014 | Kang et al. | 370/329 |
| 2014/0198683 A1* | 7/2014 | Ihm et al. | 370/252 |
| 2014/0211731 A1* | 7/2014 | Inoue | H04B 7/0456 |
| | | | 370/329 |
| 2014/0226582 A1* | 8/2014 | Zeng | H04B 7/0626 |
| | | | 370/329 |
| 2014/0241201 A1* | 8/2014 | Kim et al. | 370/252 |
| 2015/0304009 A1 | 10/2015 | Kang et al. | |

FOREIGN PATENT DOCUMENTS

| | | |
|---|---|---|
| KR | 1020110100563 | 9/2011 |
| KR | 1020120063586 | 6/2012 |
| RU | 2 369 010 | 9/2009 |
| WO | WO 2010/128744 | 11/2010 |
| WO | WO 2011/074923 | 6/2011 |
| WO | WO 2011/100672 | 8/2011 |
| WO | WO 2012/105793 | 8/2012 |
| WO | WO 2012/108805 | 8/2012 |

OTHER PUBLICATIONS

Alcatel-Lucent Shanghai Bell, "Considerations on CSI Feedback Enhancements for High-Priority Antenna Configurations", R1-112420, 3GPP TSG-RAN WG1 #66, Aug. 22-26, 2011.
European Search Report dated Apr. 8, 2016 issued in counterpart application No. 13838826.9-1874, 7 pages.
Marvell, "CSI-RS Configuration for CoMP", R1-120390, 3GPP TSG-RAN WG1 #68, Feb. 6-10, 2012, 3 pages.
European Search Report dated Mar. 16, 2017 issued in counterpart application No. 13838826.9-1874, 5 pages.
Chinese Office Action dated Apr. 5, 2017 issued in counterpart application No. 201380048890.7, 14 pages.
Russian Office Action dated May 31, 2017 issued in counterpart application No. 2015109710/07, 12 pages.

* cited by examiner

METHOD AND APPARATUS FOR TRANSMITTING AND RECEIVING CHANNEL STATE INFORMATION IN A WIRELESS COMMUNICATION SYSTEM

PRIORITY

This application claims priority under 35 U.S.C. § 119(a) to Korean Patent Application Serial Nos. 10-2012-0104790 and 10-2012-0105264, which were filed in the Korean Intellectual Property Office on Sep. 20, 2012 and Sep. 21, 2012, respectively, the content of each of which is incorporated herein by reference.

BACKGROUND OF THE INVENTION

1. Field of the Invention

The present invention relates generally to a Channel State Information (CSI) transmission and reception method and apparatus and, in particular, to a method and apparatus for transmitting and receiving CSI in a wireless communication system using a plurality of antennas.

2. Description of the Related Art

A Reference Signal (RS) is used in measuring a channel state or quality, such as signal strength and distortion, interference strength, and Gaussian noise, between a Base Station (BS) and User Equipments (UEs) (or terminals) and demodulating and decoding a received data symbol in a wireless mobile communication system. The RS is also used to measure a radio channel state. For example, a receiver measures a strength of an RS transmitted by a transmitter at a predetermined transmit power in order to determine a radio channel state between the receiver and the transmitter. Thereafter, the receiver requests a data rate from the transmitter, based on the determined radio channel state.

The $3^{rd}$ generation evolved mobile communication standards, such as the $3^{rd}$ Generation Partnership Project Long Term Evolution-Advanced (3GPP LTE-A) and Institute of Electrical and Electronics Engineers (IEEE) 802.16m, have adopted multi-carrier multiple access techniques such as Orthogonal Frequency Division Multiplexing (OFDM) or Orthogonal Frequency Division Multiple Access (OFDMA).

In a multi-carrier multiple access-based wireless mobile communication system, channel estimation and measurement performance is influenced by the number of symbols and number of subcarriers to which an RS is mapped on a time-frequency resource grid. The channel estimation and measurement performance is also influenced by the power allocated for the RS transmission. Accordingly, by allocating more radio resources (including time, frequency, and power), it is possible to improve channel estimation and measurement performance, thereby improving received data symbol demodulation and decoding performance and channel state measurement accuracy.

In a resource-constrained mobile communication system, however, if a radio resource is allocated for transmitting RSs, this reduces the available resources for data signal transmission. Accordingly, an amount of resources for RS transmission should be determined appropriately, by taking the system throughput into account.

SUMMARY

Accordingly, the present invention is designed to address at least the problems and/or disadvantages described above and to provide at least the advantages described below.

An aspect of the present invention is to provide a method and apparatus for efficiently transmitting and receiving CSI.

An aspect of the present invention is to provide a method and apparatus for efficiently transmitting and receiving CSI via a plurality of antennas.

In accordance with an aspect of the present invention, a CSI transmission method of a terminal is provided. The CSI transmission method includes receiving a first CSI Reference Signal (CSI-RS) and a second CSI-RS; transmitting a CSI indicator indicating one of the first CSI-RS and the second CSI-RS corresponding to CSI to be transmitted; and transmitting the CSI generated based on the CSI indicator until transmission of a new CSI indicator.

In accordance with another aspect of the present invention, a terminal for transmitting CSI is provided. The terminal includes a receiver configured to receive a first CSI Reference Signal (CSI-RS) and a second CSI-RS; and a transmitter configured to transmit a CSI indicator indicating one of the first CSI-RS and the second CSI-RS corresponding to CSI to be transmitted, and to transmit the CSI generated based on the CSI indicator, until transmission of a new CSI indicator.

In accordance with another aspect of the present invention, a CSI reception method of a BS is provided. The CSI reception method includes transmitting a first CSI Reference Signal (CSI-RS) and a second CSI-RS; receiving a CSI indicator indicating one of the first CSI-RS and the second CSI-RS corresponding to CSI to be received; and receiving the CSI generated based on the CSI indicator, until receipt of a new CSI indicator.

In accordance with still another aspect of the present invention, a BS for receiving CSI is provided. The BS includes a transmitter configured to transmit a first CSI Reference Signal (CSI-RS) and a second CSI-RS; and a receiver configured to receive a CSI indicator indicating one of the first CSI-RS and the second CSI-RS, and to receive CSI generated based on the CSI indicator, until receipt of a new CSI indicator.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present disclosure are described with reference to the accompanying drawings in detail. However, detailed descriptions of well-known functions and structures incorporated herein may be omitted to avoid obscuring the subject matter of the present disclosure. Further, the following terms are defined in consideration of the functionality in the present disclosure, and may vary according to the intention of a user or an operator, usage, etc. Therefore, the definition should be made on the basis of the overall content of the present specification.

Although the following description is directed to an OFDM-based radio communication system, particularly, a 3GPP Evolved Universal Terrestrial Radio Access (E-UTRA) system, it will be understood by those skilled in the art that the various embodiments of the present invention can be applied to other communication systems having similar technical backgrounds and channel formats, with slight modifications, without departing from the spirit and scope of the present invention.

Existing $3^{rd}$ and $4^{th}$ Generation mobile communication systems represented by LTE/LTE-A use a MIMO scheme with a plurality of transmit and receive antennas to transmit a plurality of information streams that are spatially separated. The technique of transmitting the spatially separated information streams is referred to as spatial multiplexing. Typically, the number of information streams that can be spatially multiplexed depends on the number of antennas of the transmitter and the receiver. Further, the number of information streams that can be spatially multiplexed is referred to as "a rank". For a MIMO scheme up to LTE/LTE-A Release 11, spatial multiplexing of up to 8×8 antennas and up to rank 8 are supported.

An FD-MIMO system, to which embodiments of the present invention will be described, is a wireless communication system capable of transmitting data using 32 or more transmit antennas and evolved from the LTE/LTE-A MIMO system supporting up to 8 transmit antennas. However, the scope of the present invention is not limited thereto.

Figure 1:
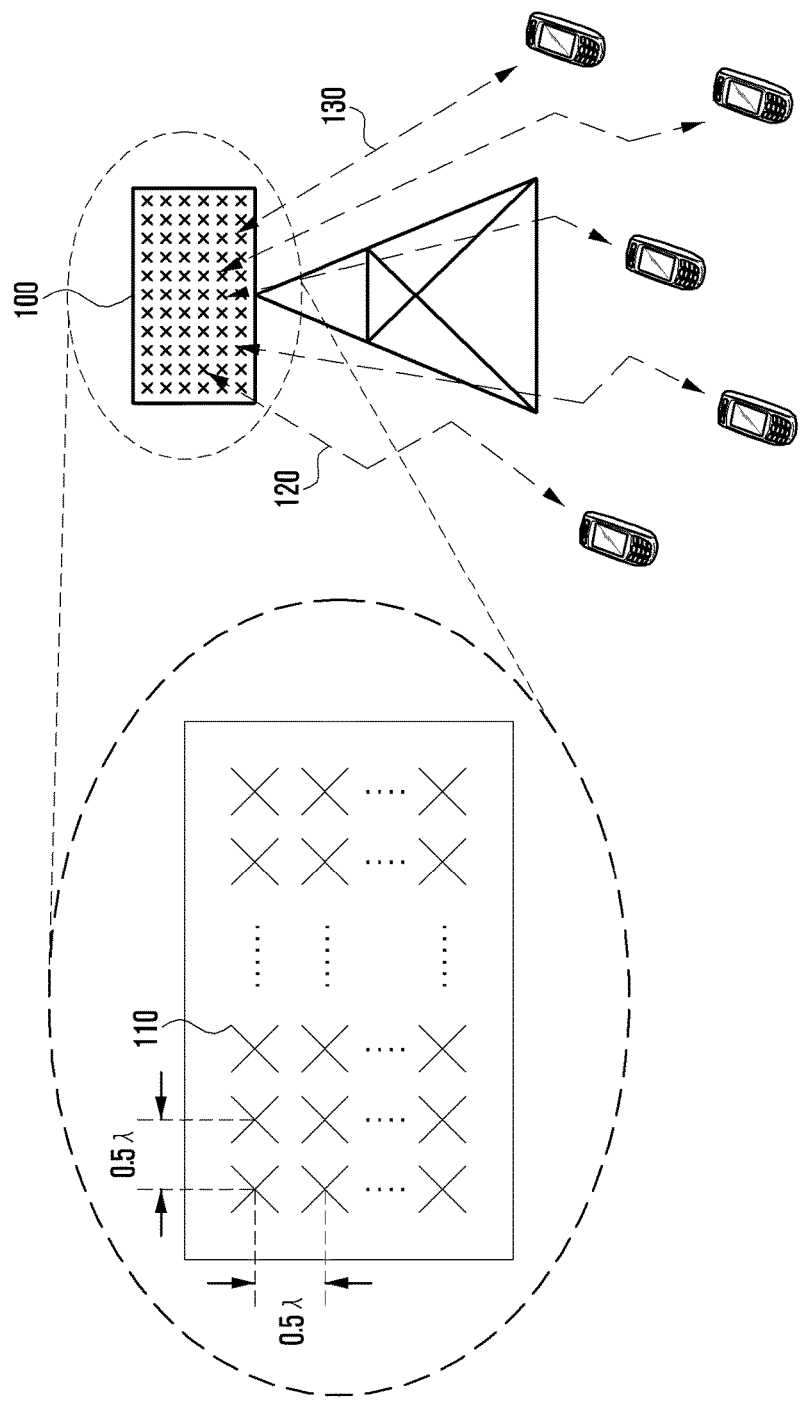
FIG. 1 illustrates a Full Dimension MIMO (FD-MIMO) system.

FIG. 1 illustrates an FD-MIMO system.

Referring to FIG. 1, a BS transmitter 100 transmits radio signals 120 and 130 through a few dozen or more transmit antennas 110. The transmit antennas 110 are arranged at minimum distance among each other. For example, the minimum distance may be half of a wavelength ($\lambda/2$). Typically, when the transmit antennas 110 are arranged at the distance of half of the wavelength of the radio signal, the signals transmitted by the respective transmit antennas are influenced by radio channel with low correlation. Assuming a radio signal band of 2 GHz, the distance is 7.5 cm, and is shortened as the band becomes higher than 2 GHz.

In FIG. 1, the transmit antennas 110 arranged at the BS transmitter 100 are used to transmit signals to one or more terminals 120 and 130.

In order to simultaneously transmit signals to a plurality terminals, an appropriated precoding is applied.

A terminal may receive a plurality of information streams. Typically, the number of information streams that a terminal can receive is determined depending on the number of receive antennas of the terminal, a channel state, and a reception capability of the terminal.

In order to efficiently implement the FD-MIMO system, a terminal should accurately measure the channel condition and interference size, and transmit the CSI to the BS efficiently.

If the CSI is received, the BS determines the terminals for downlink transmission, downlink data rates, and precoding to be applied. For an FD-MIMO system using large number of transmit antennas, if the CSI transmission method of the legacy LTE/LTE-A system is applied without modification, the amount of control information to be transmitted in an uplink increases significantly, increasing uplink overhead.

The mobile communication system is restricted in resources such as time, frequency, and transmission power. Accordingly, if the resources allocated for RSs increase, the amount of resources that may be allocated for data traffic channel transmission decreases, thereby reducing the amount of data transmission. In this case, although channel estimation and measurement performance are improved, the amount of data transmission decreases, thereby reducing the system throughput. Thus, it is important to efficiently allocate resources for RS and traffic channel transmissions, in order to maximize system throughput.

Figure 2:
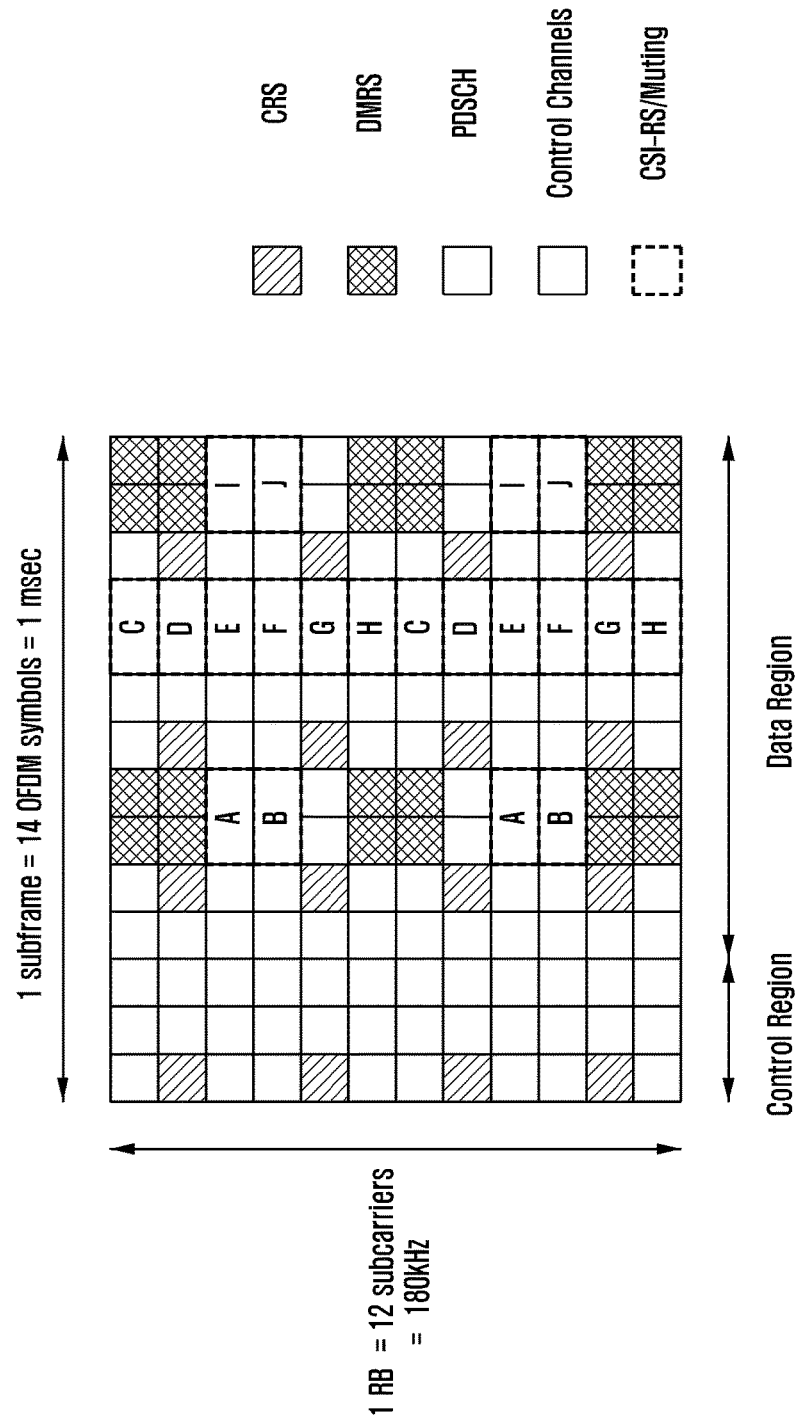
FIG. 2 is a time-frequency grid illustrating a single Resource Block (RB) of a downlink subframe as a smallest scheduling unit in an LTE/LTE-A system.

FIG. 2 is a time-frequency grid illustrating a single Resource Block (RB) of a downlink subframe as a smallest scheduling unit in an LTE/LTE-A system.

Referring to FIG. 2, a radio resource is one subframe in a time domain and one RB in a frequency domain. The radio resource includes 12 subcarriers in the frequency domain and 14 OFDM symbols in the time domain, i.e., 168 (12×14) unique frequency-time positions. In LTE/LTE-A, each frequency-time position is referred to as a Resource Element (RE).

The radio resource as illustrated in FIG. 2 can be used for transmitting a plurality of different types of signals, as follows:

1. A Cell-specific Reference Signal (CRS): an RS transmitted to all UEs within a cell;

2. a DeModulation Reference Signal (DMRS): an RS transmitted to a specific UE;

3. a Physical Downlink Shared CHannel (PDSCH): a data channel transmitted in a downlink, which an eNB uses to transmit data to the UE, and mapped to REs not used for RS transmission in a data region, as illustrated in FIG. 2;

4. a CSI Reference Signal (CSI-RS): an RS transmitted to UEs within a cell and used for channel state measurement. Multiple CSI-RSs can be transmitted within a cell; and 5. Other control channels (e.g., Physical Hybrid-ARQ Indicator CHannel (PHICH), Physical Control Format Indicator CHannel (PCFICH), and Physical Downlink Control CHannel (PDCCH)): channels for providing control channels for the UE to receive PDCCH and transmitting ACKnowledgement/Negative ACKnowledgement (ACK/NACK) of Hybrid Automatic Repeat reQuest (HARQ) operations for uplink data transmission.

In addition to the above-described signals and channels, zero power CSI-RS can be configured in order for UEs within corresponding cells to receive CSI-RSs transmitted by different eNBs in an LTE-A system. The zero power CSI-RS (muting) can be mapped to positions designated for CSI-RSs, and the UE receives the traffic signal skipping the corresponding radio resource in general.

In the LTE-A system, the zero power CSI-RS is referred to as muting. The zero power CSI-RS (muting) by nature is mapped to the CSI-RS position without transmission power allocation.

In FIG. 2, a CSI-RS can be transmitted at positions marked by A, B, C, D, E, F, G, H, I, and J, according to the number of number of antennas transmitting CSI-RS. Also, the zero power CSI-RS (muting) can be mapped to positions A, B, C, D, E, F, G, H, I, and J. The CSI-RS can be mapped to 2, 4, or 8 REs according to the number of the antenna ports for transmission.

For two antenna ports, half of a specific pattern is used for CSI-RS transmission; for four antenna ports, all of the specific pattern is used for CSI-RS transmission; and for eight antenna ports, two patterns are used for CSI-RS transmission. Muting is always performed by a pattern. That is, although the muting may be applied to according to a plurality of patterns, if the muting positions mismatch CSI-RS positions, muting cannot be applied to one pattern partially.

When transmitting CSI-RSs of two antenna ports, the CSI-RSs are mapped to two consecutive REs in the time domain and distinguished from each other using orthogonal codes. When transmitting CSI-RSs of four antenna ports, the CSI-RSs are mapped in the same way of mapping the additional two CSI-RSs to two additional consecutive REs. A similar mapping is applied when transmitting CSI-RSs of eight antenna ports.

In a cellular system, an RS transmitted for downlink channel state measurement. In a 3GPP LTE-A system, a UE measures the channel state with the eNB using a CSI-RS transmitted by the eNB. The channel state is measured in consideration of a few factors including downlink interference. The downlink interference includes the interference caused by the antennas of neighbor eNBs and thermal noise, which is effective in determining a downlink channel condition. For example, when an eNB with one transmit antenna transmits an RS to a UE with one receive antenna, the UE determines an energy per symbol that can be received in a downlink (Es) and an amount of interference that may be received while receiving the corresponding symbol (Io) in order to calculate Es/Io from the received RS. The calculated Es/Io is reported to the eNB such that the eNB determines the downlink data rate for the UE.

In an LTE-A system, a UE feeds back the information on the downlink channel state for use in downlink scheduling of the eNB. That is, the UE measures the RS transmitted by the eNB in downlink and feeds back the information estimated from the RS to the eNB in the format defined in LTE/LTE-A standard. In LTE/LTE-A, the UE feedback information includes the following three indicators:

1. a Rank Indicator (RI): an indicator of the number of spatial layers that can be supported by a current channel experienced at a UE;

2. a Precoding Matrix Indicator (PMI): an indicator of a precoding matrix recommended by a current channel experienced at a UE; and 3. a Channel Quality Indicator (CQI): an indicator of a maximum possible data rate that a UE can receive a signal at in a current channel state. The CQI may be replaced with a Signal-to-Interference-Noise Ratio (SINR), a maximum error correction code rate, and a modulation scheme, or a per-frequency data efficiency that can be used in similar way to the maximum data rate.

The RI, PMI, and CQI are associated to each other. For example, a precoding matrix supported in LTE/LTE-A is configured differently per rank. Accordingly, the PMI value 'X' is interpreted differently for an RI set to 1 and an RI set to 2. Also, when determining a CQI, the UE assumes that the PMI and RI, which it has reported, are applied by the eNB. That is, if the UE reports RI_X, PMI_Y, and CQI_Z, then the UE is capable of receiving the signal at the data rate corresponding to CQI_Z, when the rank RI_X and the precoding matrix PMI_Y are applied. Accordingly, the UE calculates a CQI with which the optimal performance is achieved in a real transmission under the assumption of the transmission mode to be selected by the eNB.

In LTE/LTE-A, a process for configuring the CSI, such as a CQI, an RI, and a PMI, to the UE is defined as "a CSI process". The CSI process includes a CSI-RS for channel measurement and an Interference Measurement Resource (IMR). The eNB may configure at least one CSI process per UE, and the UE measures a CSI-RS indicated in the CSI-RS process to acquire received signal strength of the signal passed via the channel and measures the IMR to acquire the interference strength of the received signal. The IMR is a radio resource that is configured separately by the eNB for a UE interference measurement, and the UE assumes that all of the signals received on the corresponding radio resource are interference. One IMR is configured at one of the positions A to H to which zero power CSI-RS may be applied. If the eNB configures the radio resource marked by B, as illustrated in FIG. 2, as an IMR, the UE performs interference measurement at the resource position B in every RB.

Typically, in FD-MIMO using a plurality of transmit antennas, the number of CSI-RSs increases in proportion to the number of transmit antennas. For example, in an LTE/LTE-A system using 8 transmit antennas, an eNB transmits CSI-RSs of 8 ports to a UE for downlink channel state measurement. In order to transmit 8-port CSI-RSs, 8 REs are allocated for CSI-RS transmission in one RB. For example, the REs indicated by alphabets A and B can be used for CSI-RS transmission of the corresponding eNB. When applying a CSI-RS transmission scheme of LTE/LTE-A to FD-MIMO, the CSI-RS transmission resource increases in proportion to the number of transmit antennas. That is, the eNB having 128 transmit antennas transmits CSI-RS on 128 REs in one RB. Such a CSI-RS transmission scheme consumes excessive radio resources and thus causes shortage of resource for data transmission.

Alternatively, an eNB having a plurality of transmit antennas for FD-MIMO may transmit CSI-RSs on N dimensions, such that a UE performs channel measurements for a plurality of transmit antennas without excessive resource allocation for CSI-RS transmission. For example, referring again to FIG. 1, where the transmit antennas 110 of the eNB are arranged 2-dimensionally, the CSI-RSs may be transmitted in 2 dimensions. In this case, one CSI-RS is used as a horizontal CSI-RS for acquiring the horizontal direction channel information, while the other CSI-RS is used as a vertical CSI-RS for acquiring vertical direction channel information.

Figure 3:
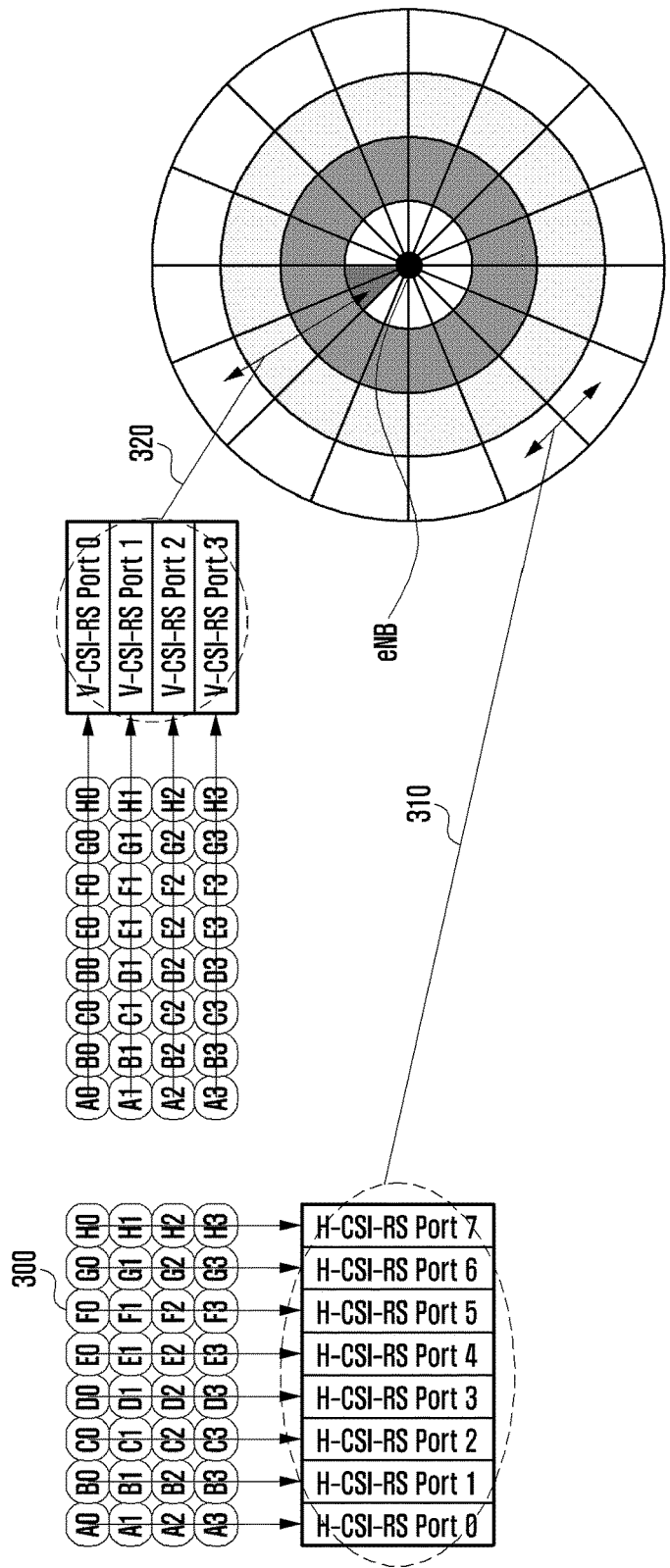
FIG. 3 illustrates CSI-RS transmission in an FD-MIMO system according to an embodiment of the present invention.

FIG. 3 illustrates CSI-RS transmission in an FD-MIMO system according to an embodiment of the present disclosure.

Referring to FIG. 3, an eNB operating in an FD-MIMO mode has a total of 32 antennas 300, by way of example. That is, the number of antennas may vary depending on the embodiment.

More specifically, in FIG. 3, the 32 antennas 300 are indicated by A0, . . . , A3, B0, . . . , B3, C0, . . . , C3, D0, . . . , D3, E0, . . . , E3, F0, . . . , F3, G0, . . . , G3, and H0, . . . , H3. Two CSI-RSs are transmitted through the 32 antennas. The antenna ports corresponding to a Horizontal CSI-RS (H-CSI-RS) for use in measuring horizontal channel state includes the following 8 antenna ports.

1. H-CSI-RS port 0: group of antennas A0, A1, A2, and A3
2. H-CSI-RS port 1: group of antennas B0, B1, B2, and B3
3. H-CSI-RS port 2: group of antennas C0, C1, C2, and C3
4. H-CSI-RS port 3: group of antennas D0, D1, D2, and D3
5. H-CSI-RS port 4: group of antennas E0, E1, E2, and E3
6. H-CSI-RS port 5: group of antennas F0, F1, F2, and F3
7. H-CSI-RS port 6: group of antennas G0, G1, G2, and G3
8. H-CSI-RS port 7: group of antennas H0, H1, H2, and H3

The expression of grouping a plurality of antennas into one CSI-RS port is a concept including antenna virtualization. Typically, antenna virtualization is performed using a linear combination of the plurality of antennas. The antenna ports corresponding to Vertical CSI-RS (V-CSI-RS) for use in measuring vertical channel state include the following 4 antenna ports.

1. V-CSI-RS port 0: group of antennas A0, B0, C0, D0, E0, F0, G0, and H0
2. V-CSI-RS port 1: group of antennas A1, B1, C1, D1, E1, F1, G1, and H1
3. V-CSI-RS port 2: group of antennas A2, B2, C2, D2, E2, F2, G2, and H2
4. V-CSI-RS port 3: group of antennas A3, B3, C3, D3, E3, F3, G3, and H3

It is assumed, herein, that the plurality of antennas are arranged 2 dimensionally, as described above. The antennas are arranged orthogonally, forming M rows in the vertical direction and N columns in the horizontal direction. In this case, the UE is capable of measuring FD-MIMO channels using N H-CSI-RS ports and M V-CSI-RS ports.

As described above, if two CSI-RSs are used, the CSI can be acquired using M+N CSI-RS ports for M×N transmit antennas. Because the channel information on a large number of transmit antennas is acquired using a relatively small number of CSI-RS ports, it is advantageous in reducing CSI-RS overhead. Although the description herein is directed to where channel information on FD-MIMO transmit antennas uses two CSI-RSs, this approach can also be applied when using more than two CSI-RSs.

In FIG. 3, the RSs of the 32 transmit antennas are mapped to 8 H-CSI-RS ports and 4 V-CSI-RS ports, and the UE measures the radio channels using the CSI-RSs of the FD-MIMO system. The H-CSI-RS can be used for estimating a horizontal angle between the UE and the eNB transmit antennas, as denoted by reference number 310, while the V-CSI-RS can be used for estimating the vertical angle between the UE and the eNB transmit antennas, as denoted by reference number 320.

For clarity, the following abbreviations will be used throughout the specification.

$RI_H$: an RI generated based on an H-CSI-RS for feedback to an eNB.
$RI_V$: an RI generated based on a V-CSI-RS for feedback to an eNB.
$RI_{HV}$: an RI generated based on an H-CSI-RS and a V-CSI-RS for feedback to an eNB.
$PMI_H$: a PMI generated based on an H-CSI-RS for feedback to an eNB.
$PMI_V$: a PMI generated based on a V-CSI-RS for feedback to an eNB.
$CQI_H$: a UE-recommended data rate generated under an assumption that only a horizontal direction precoding matrix is applied.
$CQI_V$: a UE-recommended data rate generated under an assumption that only a vertical precoding matrix is applied. —$CQI_{HV}$: a UE-recommended data rate generated under an assumption that both horizontal and vertical precoding matrices are applied.

The description is directed to using horizontal direction CSI and vertical direction CSI for convenience. However, when an eNB operates with two or more CSI-RSs, other types of CSI can be applied in addition to the horizontal and vertical direction CSI. For example, when a CSI-RS mapped to an antenna port from a first view point (a first CSI-RS) and a CSI-RS mapped to an antenna port from a second view point (a second CSI-RS) are used, the UE is capable of acquiring the CSI (the first CSI and the second CSI) based on the two respective CSI-RSs and the CSI (third CSI) based on both the CSI-RSs. The configuration described in the following description is applicable to various embodiments in similar manner.

In the following description, the CSI corresponding to the vertical direction CSI-RS is referred to as vertical direction CSI, which includes at least one of an RI, a PMI, and a CQI, acquired based on the vertical direction CSI-RS. Further, the CSI corresponding to the horizontal direction CSI-RS is referred to as horizontal direction CSI, which includes at least one of an RI, a PMI, and a CQI, acquired based on the horizontal direction CSI-RS.

When the eNB sends the UE two or more CSI-RSs, the UE is capable of transmitting the CSI corresponding to the respective CSI-RSs. Each of the CSI includes at least one of an RI, a PMI, and a CQI.

Figure 4:
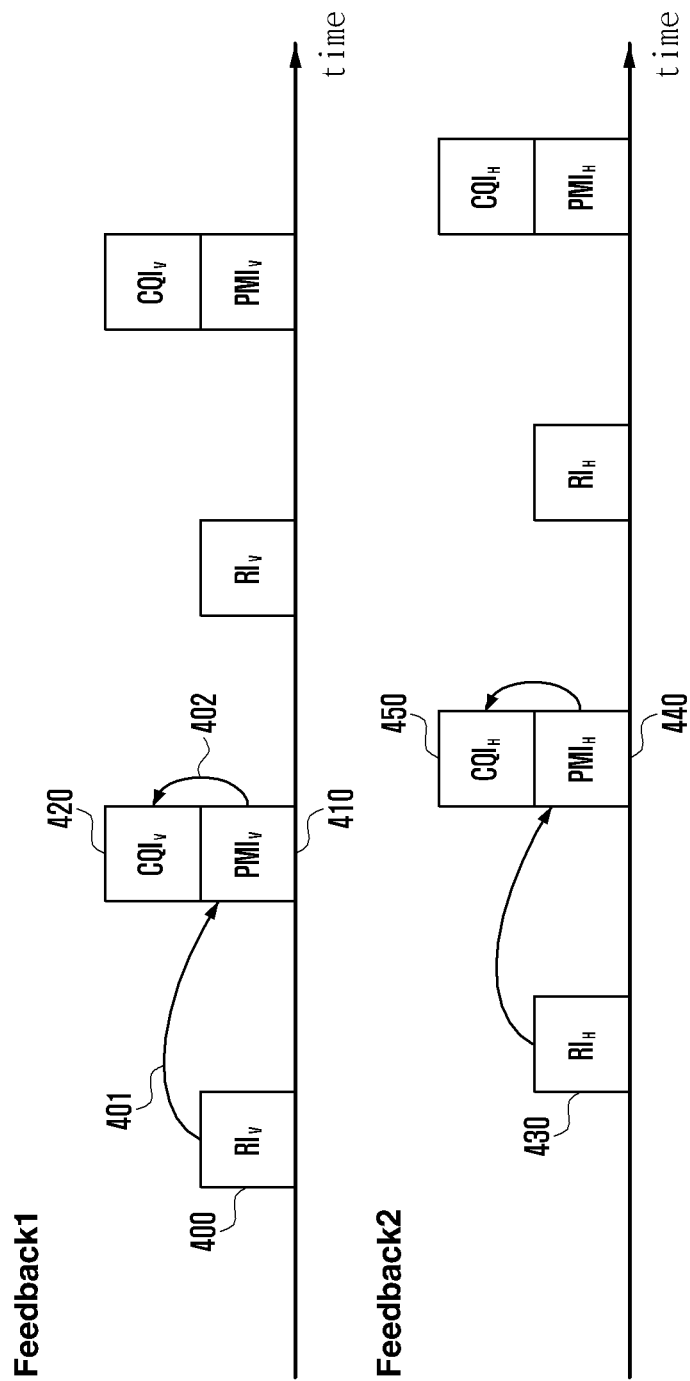
FIG. 4 illustrates the transmission of a Rank Indicator (RI), a Precoding Matrix Indicator (PMI), and a Chanel Quality Index (CQI), based on two CSI-RS, in a feedback method according to an embodiment of the present invention.

FIG. 4 illustrates the transmission of an RI, a PMI, and a CQI, based on two CSI-RS, in a feedback method according to an embodiment of the present invention. Specifically, a UE reports radio CSI of an FD-MIMO to an eNB by transmitting the RI, the PMI, and the CQI for the respective CSI-RSs.

Referring to FIG. 4, the arrows indicates how certain types of CSI are related to other types of CSI. Specifically, the arrow 401 starting from RIv 400 and ending at the $PMI_V$ 410 indicates that the $PMI_V$ 410 is interpreted differently according to the value of $RI_V$ 400. That is, the arrow 402 indicates that the UE uses the value of PMIv 410 to interpret the $CQI_V$ 420. Likewise, the UE uses the value of $RI_H$ 430 to interpret the $PMI_H$ 440, and uses the value of $PMI_H$ 440 to interpret the $CQI_H$ 450.

In FIG. 4, the UE measures the V-CSI-RS and transmits the CSI in the method indicated as Feedback 1. The UE also measures the H-CSI-RS and transmits the CSI in the method indicated as Feedback 2. Here, the RI, the PMI, and the CQI are transmitted as being correlated among each other. For Feedback 1, the $RI_V$ 400 indicates the rank of the precoding matrix indicated by $PMI_V$ 410, and the $CQI_V$ 420 indicates the data rate at which the UE can receive data or a corresponding value in the case of applying the precoding matrix of the corresponding rank which is indicated by the $PMI_V$ 410, when the transmission is performed at the rank indicated by $RI_V$ 400. For Feedback 2, $RI_H$ 430, $PMI_H$ 440, and $CQI_H$ 450 are transmitted as being correlated among each other, like Feedback 1.

As illustrated in FIG. 4, a CSI report method is used to configure a plurality of feedbacks for a plurality of transmit antennas of an FD-MIMO eNB and to make the UE report CSI to the eNB. This method is advantageous in that the UE is capable of generating and reporting CSI for FD-MIMO without extra implementation.

However, the CSI report method illustrated in FIG. 4 has a shortcoming in that it is difficult to achieve sufficient throughput of the FD-MIMO system because although the UE configures a plurality of feedbacks to report the CSI to the eNB, the CQI is generated without an assumption on the precoding when the FD-MIMO is applied, as described with reference to FIG. 4.

When a plurality of transmit antennas of an FD-MIMO system are arranged 2-dimentinally, as illustrated in FIG. 3, both the vertical direction precoding matrix and horizontal direction precoding matrix are applied to the signal transmitted by the UE. That is, the UE receives the signal to which the precoding matrices corresponding to $PMI_H$ 440 and $PMI_V$ 410, other than the signal to which one of the $PMI_H$ 440 and $PMI_V$ 410.

If only $CQI_H$ 450 and $CQI_V$ 420 corresponding to precodings indicated by the respective $PMI_H$ 440 and $PMI_V$ 410 are reported to the eNB, the eNB should determine the CQI to which both the vertical and horizontal direction precoding matrices are applied without receipt of such a CQI. However, when the eNB determines the CQI to which both the vertical and horizontal direction precoding matrices are applied arbitrarily, this may cause degradation of system performance.

As described above, one of the methods for mitigating the use of radio resource for CSI-RS transmission in an FD-MIMO system is for a UE to measure a plurality of CSI-RSs capable of efficiently estimating a plurality of transmit antennas. Each CSI-RS can be used for the UE to measure the channel state of one of a plurality of dimensions for measuring a radio channel. This method uses a relatively small amount of radio resource for CSI-RS transmission, as compared to the method that allocates unique CSI-RS ports for the respective transmit antennas. For example, using two CSI-RSs in the vertical and horizontal direction for the transmit antennas of the FD-MIMO that are arranged in the form of a rectangle, the UE is capable of efficiently measuring the channel state. In accordance with an embodiment of the present invention a novel technology and apparatus are provided that are capable of allowing the UE to measure a plurality of CSI-RSs and efficiently report the CSI in the FD-MIMO system including a plurality of transmit antennas.

Figure 5:
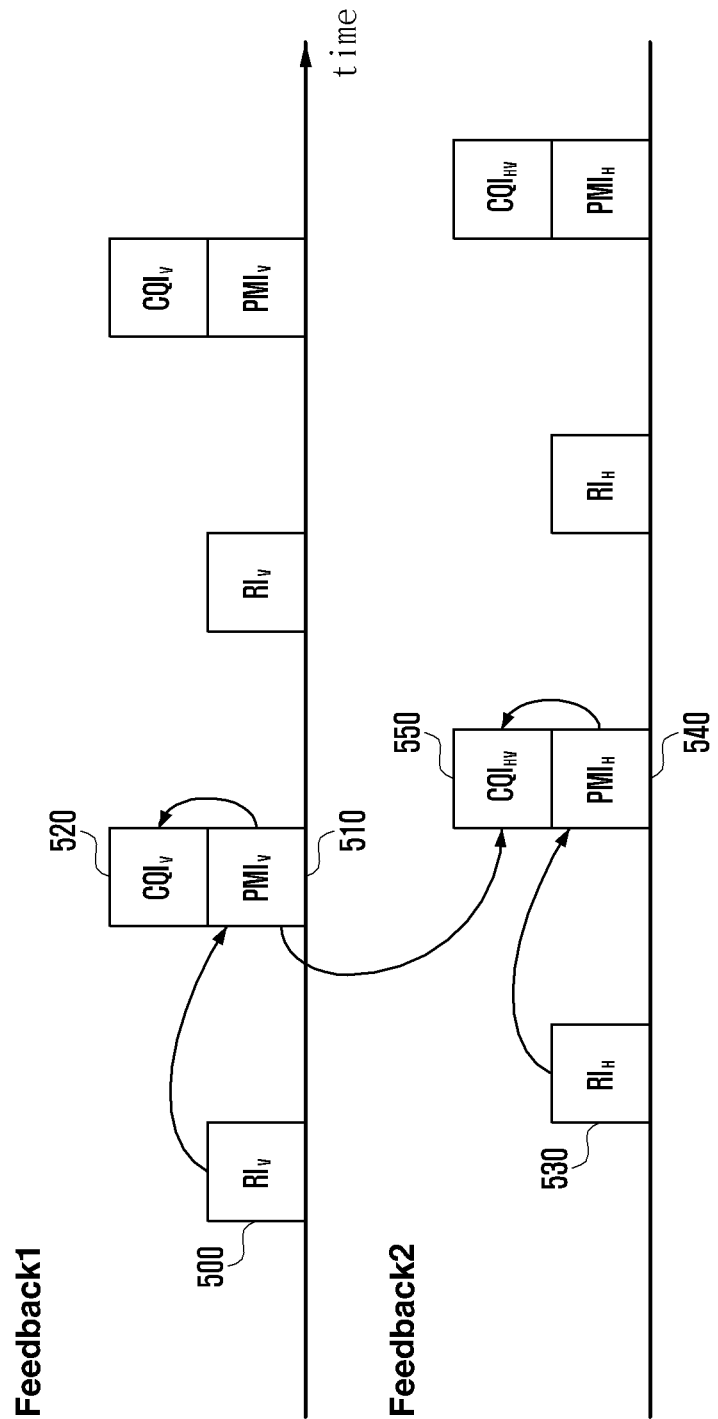
FIG. 5 illustrates the transmission of CSI according to an embodiment of the present invention.

FIG. 5 illustrates the transmission of CSI according to an embodiment of the present invention.

Referring to FIG. 5, the CSI corresponding to the two CSI-RSs are reported similarly as described above in conjunction with FIG. 4. The same as in FIG. 1, the UE measures a V-CSI-RS to report $RI_V$ 500, $PMI_V$ 510, and $CQI_V$ 520 to the eNB in Feedback 1. However, FIG. 5 differs from FIG. 4 in that in Feedback 2, the UE reports the CQI when precoding is applied in both the vertical and horizontal directions, i.e., $CQI_{HV}$ 550, to the eNB. That is, the UE reports the most recent $PMI_V$ 510, which is generated in the procedure indicated with Feedback 1, and $CQI_{HV}$ 550, which is generated when the precodings indicated by the PMI 540 that is determined optimal based on the H-CSI-RS measurement.

In FIG. 5, the UE measures the V-CSI-RS to generate $RI_V$ 500, which is reported to the eNB. The UE determines an optimal $PMI_V$ 510 to the corresponding rank 500 and reports $CQI_V$ 520 when the precoding indicated by the $PMI_V$ 510 is applied. The UE measures an H-CSI-RS to generate RI 530, which is reported to the eNB. The UE reports, to the eNB, the $CQI_{HV}$ 550 generated by applying the precoding indicated by PMI 549, which is optimal to the corresponding rank 530, and the precoding indicated by the previously transmitted $PMI_V$ 510.

As illustrated in FIG. 5, in order for the UE to report the CQI value when the precoding matrix indicated by $PMI_H$ 540 and the precoding matrix indicated by $PMI_V$ 510 are simultaneously allocated to the eNB, the following may be performed.

First, a function is defined for determining whether to take two PMIs into consideration to determine at least one of two CQIs. That is, the eNB notifies the UE of the correlation of the feedback information in configuring feedbacks to the UE, and the UE generates CQI based thereon. In FIG. 5, a control message instructing the UE to calculate the second CQI, i.e., $CQI_{HV}$ 550, by applying the first PMI, i.e., $PMI_V$ 510, and the second PMI, i.e., $PMI_H$ 540, together is transmitted from the eNB.

Second, how to determine a CQI is defined when applying a plurality of precodings. When calculating a CQI, when only one precoding is applied, the UE calculates the CQI under an assumption that the precoding indicated by an RI and a PMI it has reported is applied in a downlink. However, for $CQI_{HV}$ 550, the UE calculates the CQI under an assumption that two precodings are simultaneously applied in the downlink. The UE may interpret the application of two precodings as a Kronecker product. The Kronecker product is defined with two matrices as shown in Equation (1).

$$A \otimes B = \begin{bmatrix} a_{11}B & \cdots & a_{1n}B \\ \vdots & \ddots & \vdots \\ a_{m1}B & \cdots & a_{mn}B \end{bmatrix} \quad (1)$$

In Equation (1), A and B denote matrices, and $a_{11}$ to $a_{mn}$ denote elements of matrix A. Herein, $a_{ij}$ denotes the element at $i_{th}$ row and $j_{th}$ column of the matrix A.

Using Equation (1), the UE may acquire the precoding matrix when two precoding matrices are applied simultaneously by replacing A and B with the precoding matrices indicated by $PMI_H$ 540 and the $PMI_V$ 510, respectively. When calculating $CQI_{HV}$ 550, the UE calculates $CQI_{HV}$ 550 under the assumption that the precoding matrix acquired by applying Equation (1) to the precoding matrices indicated by the $PMI_H$ 540 and $PMI_V$ 510 is applied in the downlink.

In order to acquire the precoding matrix when the two precoding matrices are applied using the Kronecker product of Equation (1), the UE and eNB will operate differently depending on the rank reported by the UE. Herein, three different methods are proposed for this purpose.

Rank-Related Embodiment 1

An eNB configures one of $RI_V$ 500 and $RI_H$ 530 with rank 1 always. For example, if $CQI_{HV}$ 550 is reported along with $RI_H$530 to the eNB, $RI_V$ 500 is restricted to be always set to 1. At this time, the rank supported when two precoding matrices are simultaneously applied is determined depending on $RI_H$530. That is, $RI_H$530 is set to 1, indicates that the UE is capable of supporting rank 1; and if $RI_H$530 is set to 2, this indicates that the UE is capable of supporting rank 2. The UE and the eNB operate in the FD-MIMO system under this assumption. Although two CSI-RSs are assumed in this embodiment, if the number of CSI-RS is 3 or more, RIs are set to 1, except for the RI corresponding to one CSI-RS.

Rank-Related Embodiment 2

When the vertical and horizontal direction precoding matrices are applied simultaneously, the eNB and the UE determines the rank supportable by the UE using Equation (2).

$$rank_{HV}=rank(RI_H) \times rank(RI_V) \quad (2)$$

That is, the UE and the eNB exchange the CSI under an assumption that the rank for a case in which the vertical and horizontal direction precoding matrices are simultaneously applied is the product of the two ranks supportable in the respective directions. For example, if the UE reports the $RI_H$ set to 2 and $RI_V$ set to 3 to the eNB, the eNB and the UE assume that the rank for the case where all of the precoding matrices are applied is 6. The value of $rank_{HV}$ is a value acquired using Equation (2), with $RI_V$ and $RI_H$ transmitted from the UE to the eNB without any extra explicit signaling.

In LTE/LTE-A, if the UE reports to the eNB the RI corresponding to rank 2 or higher, two CQI values are reported to the eNB. That is, because the eNB transmits two codewords to the UE and the UE reports the CQIs corresponding to respective codewords, separately.

When the method of Equation (2) is applied in FIG. 5, if the rank for the case where the precodings obtained using Equation (2) is 2 or higher, although $RI_H$ 530 is set to 1, the UE transmits the two CQIs in the form of $CQI_{HV}$ 550. Also, if the rank for the case where all of the precodings obtained by Equation (2) is 2 or higher, the eNB receives the two CQIs under an assumption that they are transmitted in the form of $CQI_{HV}$ 550.

In the method of measuring, at the UE, the horizontal and vertical direction CSI corresponding to two CSI-RSs and reporting the CSI to the eNB, as illustrated in FIG. 4 or 5, how to transmit Feedback 1 and Feedback 2 may cause a collision. Herein, the term "collision" refers to a situation requiring simultaneous transmission of Feedback 1 and Feedback 2. If collision is predicted, the UE may report the CSI of one of Feedback 1 and Feedback 2. The FD-MIMO operation with the configuration of a plurality of feedbacks, as illustrated in FIG. 4 or 5, may result on the CSI partially missing.

Figure 6:
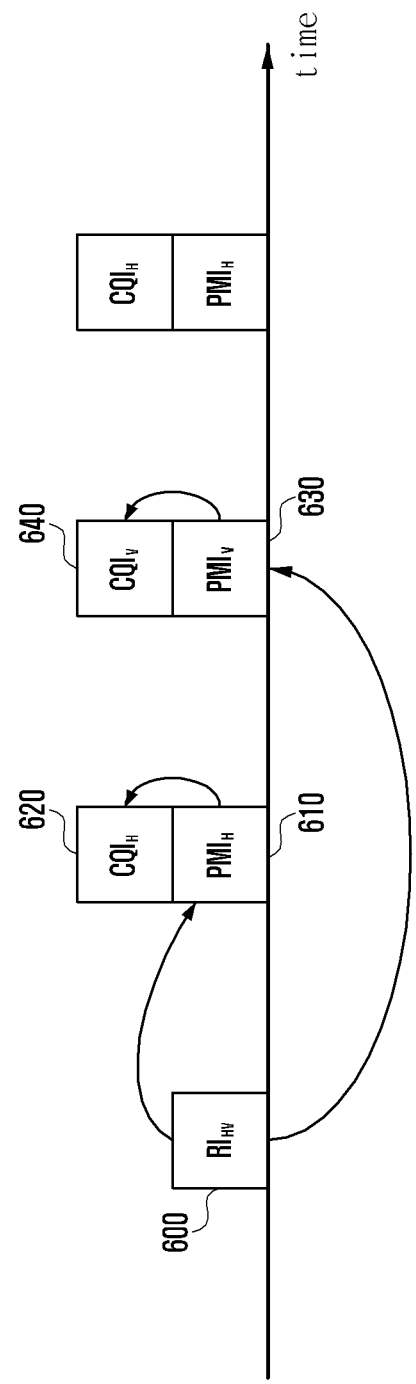
FIG. 6 illustrates the transmission of CSI according to an embodiment of the present invention.

FIG. 6 illustrates the transmission of CSI according to an embodiment of the present invention.

Although the UE reports the CSI corresponding to two CSI-RSs, the feedback method of FIG. 6 differs from FIG. 4 in that the feedback is completed in one feedback process.

Referring to FIG. 6, the UE transmits $RI_{HV}$ 600 to report the horizontal and vertical direction ranks. Table 1 shows exemplary horizontal and vertical direction ranks (first second ranks).

TABLE 1

| $RI_{HV}$ | Horizontal direction rank | Vertical direction rank |
|---|---|---|
| 000 | 1 | 1 |
| 001 | 2 | 1 |
| 010 | 3 | 1 |
| 011 | 4 | 1 |
| 100 | 1 | 2 |
| 101 | 2 | 2 |
| 110 | 3 | 2 |
| 111 | 4 | 2 |

The eNB may acquire the horizontal and vertical direction ranks from the $RI_{HV}$ 600 transmitted by the UE. The UE determines the value $RI_{HV}$ 600 based on both of the two CSI-RSs, i.e., H-CSI-RS and V-CSI-RS. The eNB checks the information on the horizontal and vertical direction precodings and UE-supportable data rate based on the PMIs 610 and 630 and CQIs 620 and 640 corresponding to the H-CSI-RS and V-CSI-RS. Because the horizontal and vertical direction PMIs and CQIs are transmitted alternately in one feedback process, it is possible to avoid the collisions of the feedback transmissions that may occur in the embodiments illustrated in FIGS. 4 and 5.

In FIG. 6, the horizontal and vertical direction ranks may have different values depending on the value of $RI_{HV}$ 600 reported by the UE. That is, the precoding matrix indicated by $PMI_H$ 610 is determined depending on the horizontal direction PMI indicated by the value of the $RI_{HV}$ 600. The UE also transmits a CQI obtained under an assumption of that the precoding matrix indicated by $RI_H$ 610 is applied, wherein the CQI may be $CQI_H$ 620. In order to determine the values of $PMI_H$ 610 and $CQI_H$ 620, the UE measures the H-CSI-RS. Likewise, the precoding matrix indicated by $PMI_V$ 630 is determined depending on the vertical direction rank indicated by $RI_{HV}$ 600. The UE also transmits a CQI obtained under an assumption that the precoding matrix indicated by $PMI_V$ 630 is applied, i.e., $CQI_V$ 640.

In order to determine the values of $PMI_V$ 630 and $CQI_V$ 640, the UE measures a V-CSI-RS. The precodings indicated by $PMI_H$ and $PMI_V$ are interpreted differently depending on the horizontal and vertical direction ranks indicated by $RI_{HV}$. That is, the precoding indicated by $PMI_H$ where $RI_{HV}$ indicates the horizontal direction rank 1 differs from the precoding indicated by $PMI_H$ where $RI_{HV}$ indicates the horizontal direction rank 2.

Referring to FIG. 6, the UE alternately transmits the horizontal CSI 610 and 620 and the vertical CSI 630 and 640. It is also possible for the UE to alternately transmit the horizontal and vertical CSI at the same interval.

In the real system, however, such a method may not appropriate. That is, it may advantageous for the UE to report specific direction CSI at an interval shorter than that of the other direction CSI in view of system through optimization. In order for the UE to report CSI corresponding to a plurality of CSI-RSs to the eNB at different intervals, the eNB may perform configuration thereon. That is, in the case that the UE reports different direction CSI to the eNB in one feedback process, the eNB may notifies the UE of the following information for configuration thereon.

Feedback interval and frame offset for horizontal direction CSI ($CQI_H$, $PMI_H$), i.e. first CSI.

Feedback interval and frame offset for vertical direction CSI ($CQI_V$ and $PMI_V$), i.e. second CSI.

The subframe offset value is the value determining the subframe position for real transmission in a period. For example, if the period is 10 milliseconds (msec) and the subframe offset is 5, then the corresponding signal is transmitted at a subframe 5 in a period of 10 milliseconds.

In FIG. 6, the horizontal and vertical direction ranks reported from the UE to the eNB may be determined depending on different rank restrictions. Here, the rank restriction is to restrict, when the UE measures the RS to determine the rank, the maximum value to the value preconfigured by the eNB. In the mobile communication system, if the eNB is allowed to restrict the maximum value of the rank for the UE, it can be interpreted as a part of the optimization procedure for controlling the system in the eNB-preferred way. In order to apply the rank restriction to the respective horizontal and vertical direction ranks, the eNB may notify the UE of the Maximum value of horizontal direction rank and Maximum value of vertical direction rank through higher layer signaling or in another method.

In addition, to configure the maximum values of the horizontal and vertical direction ranks separately, a subset of precodings that may by used by the UE may be configured for horizontal and vertical directions. Assuming that there are a set of precodings applicable to the horizontal and vertical directions, the eNB determines a subset of the set in consideration of the radio channel condition and notifies the UE of the subset. In this case, the UE selects the $PMI_H$ and $PMI_V$ in the range matching the notified subset of precodings and reports the selected PMIs to the eNB.

Figure 7:
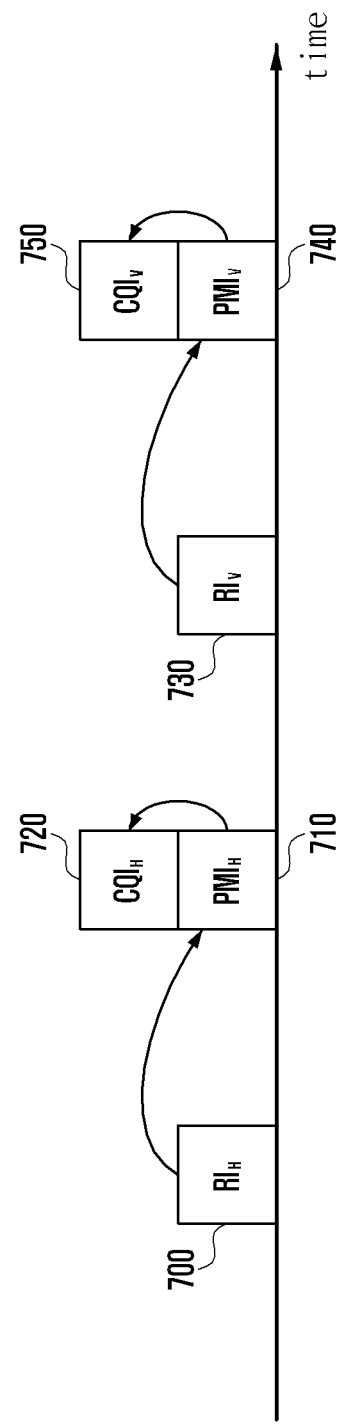
FIG. 7 illustrates the transmission of CSI according to another embodiment of the present invention.

FIG. 7 illustrates the transmission of CSI according to another embodiment of the present invention. Specifically, in FIG. 7, the UE reports the CSI to the eNB in one feedback process, similar to FIG. 6. However, FIG. 7 differs from FIG. 6 in that the horizontal and vertical direction ranks are reported with $RI_H$ 700 and $RI_V$ 730 separately.

Referring to FIG. 7, $RI_H$ 700 is first reported and then followed by $PMI_H$ 710 and $CQI_H$ 720 based thereon. Also, $RI_V$ 730 is reported and then followed by $PMI_V$ 710 and $CQI_V$ 720 based thereon. Although the $RI_H$ 700 and $RI_V$ 730 are reported separately, the intervals and ranks of the horizontal and vertical CSI may be configured differently, as in FIG. 6.

Figure 8:
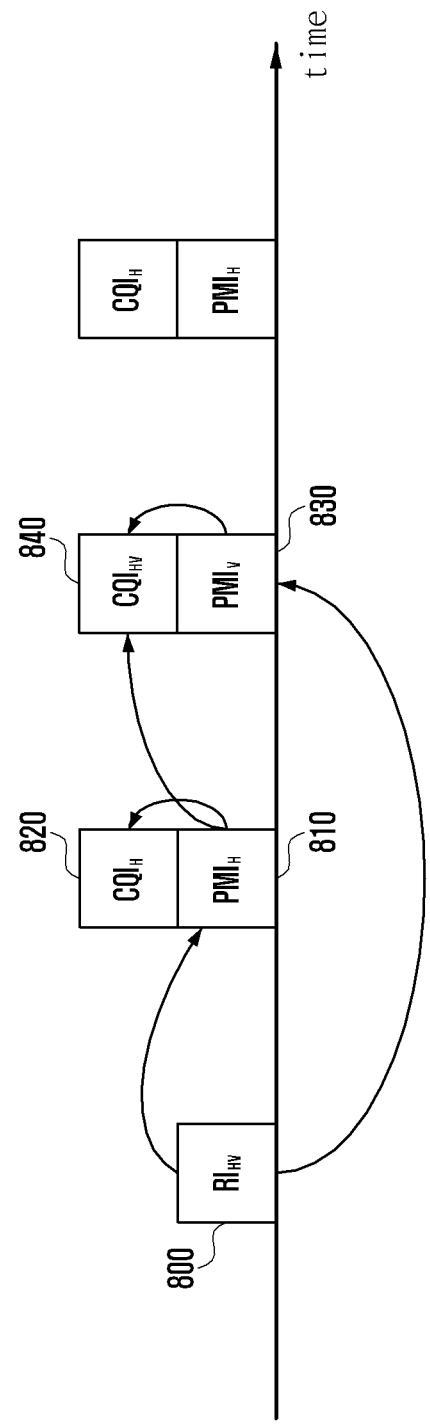
FIG. 8 illustrates the transmission of CSI according to another embodiment of the present invention.

FIG. 8 illustrates the transmission of CSI according to another embodiment of the present invention.

When the UE reports the CSI corresponding to CSI-RSs in a signal feedback process, as in FIGS. 6 and 7, the absence of the CQI where the horizontal and vertical direction precodings are applied simultaneously may cause system performance degradation, as described above.

Referring to FIG. 8, the UE transmits $RI_{HV}$ 800 to the eNB. The eNB may acquire or recognize the horizontal and vertical direction ranks based on $RI_{HV}$. The UE transmits the horizontal direction CSI including $PMI_H$ 810 and $CQI_H$ 820. The UE also simultaneously transmits $PMI_V$ 830 as the horizontal CSI and the CQI acquired by taking both the horizontal and vertical direction precodings into account, i.e., $CQI_{HV}$. $CQI_{HV}$ 840 is acquired where the horizontal and vertical direction precodings are applied. Accordingly, the rank is also determined as a function of the horizontal and vertical direction ranks. Here, the UE assumes the Kronecker product of the two precoding matrices as shown in Equation (1) as the precoding applied for generating $CQI_{HV}$ 840.

The method of transmitting the horizontal and vertical direction CSI and $CQI_{HV}$ 840 from the UE to the eNB in a signal feedback process as illustrated in FIG. 8 makes it possible to transmit the value of $CQI_{HV}$ 840. However, this method has a shortcoming in that the $CQI_H$ 820 generated under the assumption of the application of only the horizontal direction precoding has a low utilization degree. In FIG. 8, the $CQI_H$ 820 is transmitted because the information on $PMI_H$ 810 and $PMI_V$ 830 is required for transmitting CQI assuming horizontal and vertical direction precodings, but only one of the PMIs can be reported at the timing of transmitting the $CQI_H$ 820.

Figure 9:
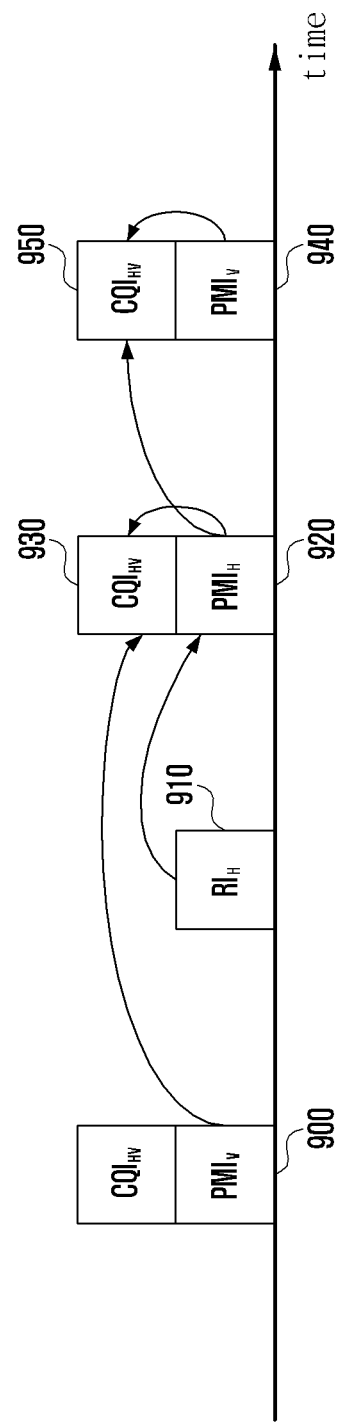
FIG. 9 illustrates the transmission of CSI according to another embodiment of the present invention.

FIG. 9 illustrates the transmission of CSI according to another embodiment of the present invention.

In FIG. 9, all CQI values reported from the UE to the eNB are generated under an assumption that the horizontal and vertical direction precodings are applied, unlike in FIG. 8.

Referring to FIG. 9, the UE generates $CQI_{HV}$ 930 under an assumption that the horizontal and vertical precoding matrices have been applied, as indicated by $PMI_V$ 900 and $PMI_H$ 920. That is, the UE generates $CQI_{HV}$ 930, which is transmitted with the $PMI_H$ 920 under the assumption that both the precoding matrix indicated by $PMI_V$ 900 as the most recently transmitted vertical direction precoding-related information and the precoding matrix indicated by $PMI_H$ 920 have been applied. Likewise, the UE generates $CQI_{HV}$ transmitted along with $PMI_V$ 940 under an assumption that both the precoding matrix indicated by $PMI_H$ 920 as the most recently transmitted horizontal direction precoding-related information and the precoding matrix indicated by $PMI_V$ 940 have been applied. The reason for referencing the previously transmitted $PMI_H$ or $PMI_V$ is to prevent a plurality of PMIs from being transmitted in one time duration.

In order to transmit $CQI_{HV}$ at each CQI transmission occasion, as illustrated in FIG. 9, the rank is restricted in a specific direction. In order to change the horizontal and vertical direction ranks simultaneously, the horizontal and vertical direction precodings are updated according to the changed rank values. In this case, $CQI_{HV}$ may be transmitted after the two precodings have been updated. Here, it is assumed that the vertical direction rank is always fixed to 1 in FIG. 9. Because the vertical direction rank is always 1, the vertical direction rank is not changed and the UE is capable of assuming that the precoding matrix indicated by the previously transmitted $PMI_V$ and the precoding matrix indicated by $PMI_V$ are applied simultaneously. Although FIG. 9 is described where the vertical direction rank is fixed to 1, alternatively, the horizontal direction rank may be fixed to 1. When the horizontal direction rank is fixed to 1, the UE reports $RI_V$ at each RI transmission occasion, instead of $RI_H$.

Alternatively, the transmission intervals of RI, horizontal direction CSI 920 and 930, and vertical direction CSI 940 and 950 in FIG. 9 may be configured differently depending on the system environment.

Figure 10:
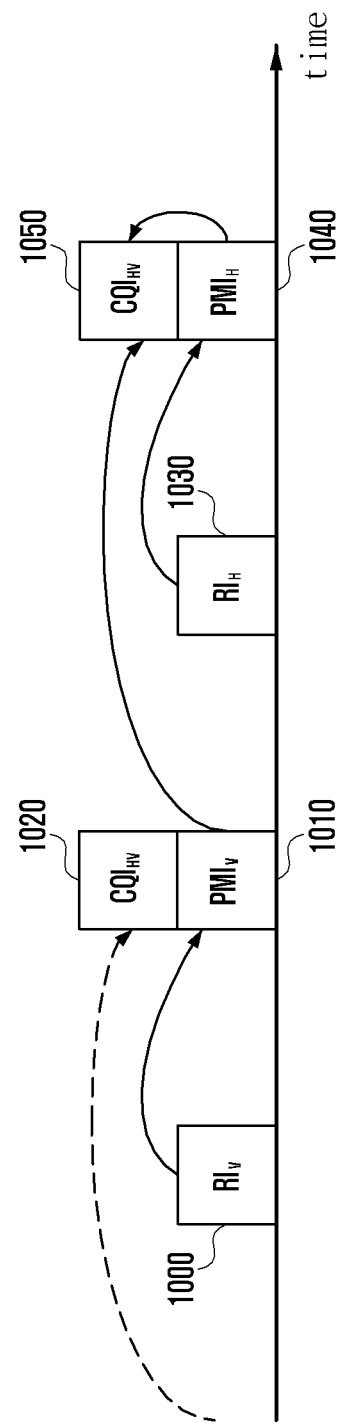
FIG. 10 illustrates the transmission of CSI according to another embodiment of the present invention.

FIG. 10 illustrates the transmission of CSI according to another embodiment of the present invention.

Referring to FIG. 10, the UE transmits $CQI_{HV}$ under an assumption that horizontal and vertical direction precodings are applied at each CQI transmission occasion, similar to FIG. 9. However, in FIG. 10, an additional $RI_V$ 1000 is transmitted to change the vertical direction rank. That is, the UE notifies the eNB of the vertical direction rank using $RI_V$ 1000 and reports $PMI_V$ 1010 based thereon. The $CQI_{HV}$ 1020 transmitted with $PMI_V$ 1010 is generated under an assumption that the precoding matrix indicated by the most recently transmitted RI and PMI and the precoding matrix indicated by the $PMI_V$ 1010 are applied. When the horizontal direction rank is updated with the $RI_H$ 1030, the UE updates the PMI 1040 based thereon and generates $CQI_{HV}$ 1050 under an assumption that the precoding indicated by $PMI_V$ 1010 and the precoding indicated by $PMI_H$ 1040 are applied simultaneously.

In FIG. 10, the UE may update the horizontal and vertical direction ranks separately. Accordingly, the UE calculates the rank to be assumed for generating the CSI $CQI_{HV}$ 1020 and 1050 using Equation (2). The UE may assume that the rank for generating $CQI_{HV}$ 1050 is the product of the ranks indicated by $RI_V$ 1000 and $RI_H$ 1030. Accordingly, if the product of the ranks indicated by $RI_V$ 1000 and $RI_H$ 1030 when the $CQI_{HV}$ 1050 is transmitted is 1, the UE transmits one CQI; and, if the product is greater than or equal to 2, the UE transmits two CQIs.

According to the above-described embodiments illustrated in FIGS. 5 to 10, the UE transmits the CSI corresponding to at least one of the horizontal and vertical CSI-RS at an interval preconfigured by the eNB. That is, the UE transmits the CSI corresponding to the first CSI-RS at a first timing preconfigured by the eNB and the CSI corresponding to the second CSI-RS at a second timing preconfigured by the eNB. The UE may transmit the CSI generated in consideration of both the CSI-RSs at a third timing preconfigured by the eNB. According to FIG. 10, the CSI corresponding to the horizontal direction CSI-RS and the CSI corresponding to the vertical direction CSI-RS are alternately transmitted to the eNB.

According to an embodiment of the present invention, the horizontal and vertical direction CSI may be transmitted at respective transmission intervals indicated through higher layer signaling. However, when differentiating between the transmission intervals of the horizontal and vertical direction CSI using the higher layer signaling, it is difficult to optimally meet the variation of the radio channel between the eNB and the UE. For example, because the UE is mobile, the variation of the radio channel may occur in a horizontal or vertical direction according to the movement. Because the eNB has no way of being aware of the movement direction of the UE in advance, it is difficult to secure the optimal system throughput in the way that the eNB notifies the UE of the horizontal and vertical direction CSI feedback configuration through higher layer signaling.

In order to solve this problem, in accordance with an embodiment of the present invention, a CSI indicator is provided in order for the UE to notify the eNB of the CSI-RS to which the transmitted CSI corresponds. When the horizontal and vertical direction CSI-RSs are received, the UE generates the CSI indicator indicating the CSI-RS corresponding to the CSI which the UE is reporting. In this case, the CSI indicator may be expressed as a Dimension Indicator (DI).

As the control information is reported to the eNB, the DI is transmitted with or separately from the CSI and notifies the eNB of the CSI-RS corresponding to the CSI transmitted by the UE. That is, the UE uses the DI to notify the eNB whether the CSI transmitted at a certain timing has been generated based on the horizontal direction CSI-RS or the vertical CSI-RS.

As described above, the CSI indicator may be applied where a plurality of CSI-RSs are used without the horizontal and vertical directionality concept. That is, if the eNB configures CSI-RSs in order for the UE to measure the CSI-RSs and report corresponding CSI for FD-MIMO, the UE may inform the eNB of the CSI-RS corresponding to the currently reported CSI, among the CSI-RSs, using the CSI indicator.

Figure 11:
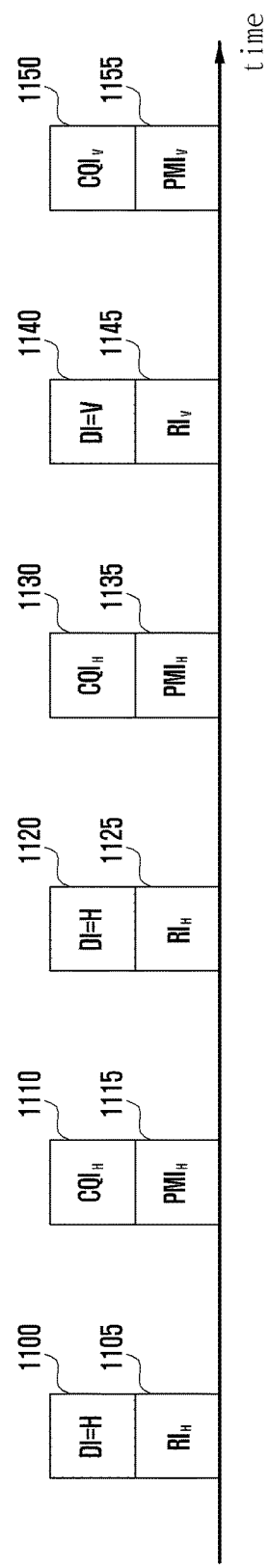
FIG. 11 illustrates the transmission of CSI according to another embodiment of the present invention.

FIG. 11 illustrates the transmission of CSI according to another embodiment of the present invention.

Referring to FIG. 11, the UE transmits DI 1100 to notify the eNB that the CSI transmitted before the next DI 1120 corresponds to the horizontal direction CSI-RS using DI 1100. That is, if the UE transmits the DI set to 0 for indicating the CSI corresponding to the horizontal direction CSI-RS, this indicates that an RI, a CQI, and a PMI transmitted before the next DI is received are the CSI corresponding to the horizontal direction CSI-RS. Otherwise, if the UE transmits the DI set to 1 for indicating the CSI corresponding to the vertical direction CSI-RS, this indicates that the RI, the CQI, and the PMI transmitted before the next DI is received are the CSI corresponding to the vertical direction CSI-RS.

Referring to FIG. 11, the UE transmits DIs 1100, 1120, and 1140 when transmitting the RIs 1105, 1125, and 1145, respectively. This method of transmitting the DI along with RI is advantageous in preventing the CSI amount from increasing significantly and reducing extra uplink overhead caused by the DI transmission. For the same reason, it is possible to transmit DI at some RI transmission occasions, i.e., not at all the RI transmission occasions. If no DI is received at an RI occasion, the eNB may assume that the CSI transmitted before receipt of a new DI are still the CSI corresponding to the CSI-RS, i.e., vertical or horizontal direction CSI-RS, indicated by the most recent DI.

FIG. 11 applies the DI concept to the embodiment as illustrated in FIG. 7. Accordingly, in FIG. 11, the UE may notify the eNB of the CSI in an optimal method, in consideration of its channel condition, improving throughput as compared to the embodiment illustrated in FIG. 7.

Figure 12:
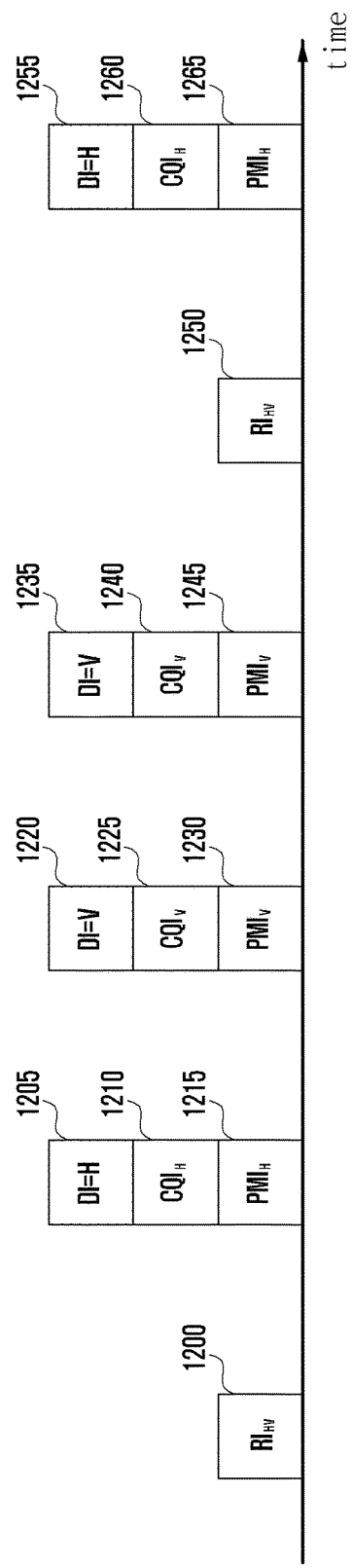
FIG. 12 illustrates the transmission of CSI according to an embodiment of the present invention.

FIG. 12 illustrates the transmission of CSI according to an embodiment of the present invention. Specifically, FIG. 12 applies the DI concept to the embodiment illustrated in FIG. 6.

In FIG. 12, $RI_{HV}$ 1200 and 1250 is the rank indicator indicating a combination of the horizontal and vertical direction ranks. When using $RI_{HV}$, DI may be transmitted along with the $RI_{HV}$ to indicate the CSI-RS corresponding to the PMI and/or CQI transmitted before the next DI, as in FIG. 11. The DI also may be transmitted with the PMI and/or CQI instead of $RI_{HV}$. In this case, DI may indicate the CSI-RS corresponding to the PMI and/or CQI transmitted along with the DI. FIG. 12 illustrates where DI is transmitted with the PMI and/or CQI, at the same time.

Referring to FIG. 12, the UE transmits DI to indicate the CSI-RS corresponding to the PMI and CQI transmitted with the DI. In FIG. 12, the DI 1205 indicates that the CSI transmitted at the same time corresponds to the horizontal direction CSI-RS. Specifically, the UE transmits $PMI_H$ 1215 and $CQI_H$ 1210 corresponding to the horizontal CSI-RS, with the DI 1205.

DI 1220 indicates that the CSI transmitted at the same time corresponds to the vertical direction CSI-RS. Specifically, the UE transmits $PMI_V$ 1230 and $CQI_V$ 1225 with the DI 1220.

DI 1235 indicates that the CSI transmitted at the same time corresponds to the vertical direction CSI-RS. Specifically, the UE transmits $PMI_V$ 1245 and $CQI_V$ 1240 with the DI 1235.

The DI 1255 indicates that the CSI transmitted at the same time corresponds to the horizontal direction CSI-RS. Specifically, the UE transmits $PMI_H$ 1265 and $CQI_H$ 1260 corresponding to the horizontal CSI-RS, with the DI 1255.

Figure 13:
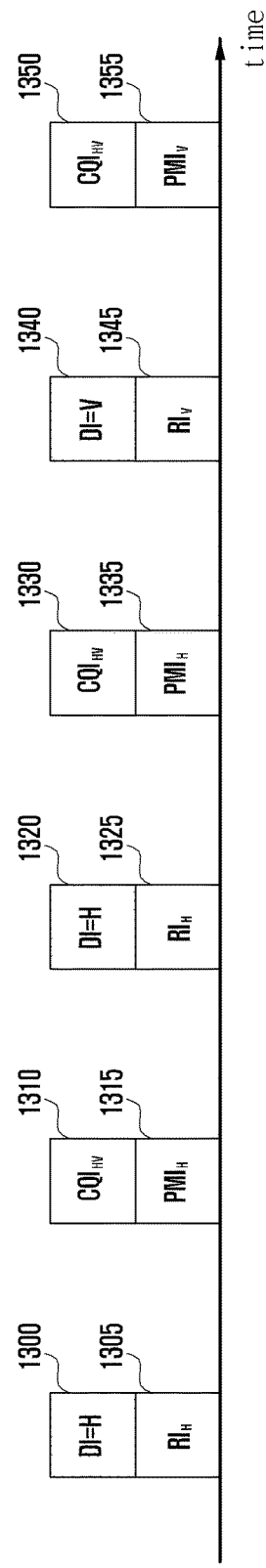
FIG. 13 illustrates the transmission of CSI according to another embodiment of the present invention.

FIG. 13 illustrates the transmission of CSI according to another embodiment of the present invention. Specifically, FIG. 13 applies the DI concept to the embodiment illustrated in FIG. 10.

Referring to FIG. 13, the UE transmits the DI 1300 to notify the eNB of the CSI-RS corresponding to the CSI transmitted at the same time as the DI 1300, and until a new DI, i.e., DI 1320, is received. According to the indication of the DI, the RI and PMI transmitted at the same and after may be the CSI corresponding to the horizontal or vertical CSI-RS.

In FIG. 13, because the DI 1300 indicates the horizontal direction CSI-RS, the $RI_H$ 1305 and $PMI_H$ 1315 are transmitted. Although the DI indicates the horizontal direction CSI-RS, the UE transmits $CQI_{HV}$ 1310 generated in consideration of both the horizontal and vertical direction CSI-RSs. As described above, if the $CQI_{HV}$ is transmitted, the UE reports the CQI value generated in consideration of both the horizontal and vertical precodings, resulting in improved resource utilization efficiency.

The $CQI_{HV}$ 1310 may be interpreted differently, with or without the presence of DI. As described above, the UE generates $CQI_{HV}$ under an assumption that the eNB has applied both the horizontal and vertical direction precoding matrices. That is, if the precoding matrix indicated by $PMI_H$ is A and the precoding matrix indicated by $PHI_V$ is B, the UE assumes that the precoding matrix, such as that shown in Equation (1), is applied by the eNB.

Referring again to FIG. 13, different a horizontal or vertical direction precoding matrix is assumed in the process of generating $CQI_{HV}$ depending on the value of DI. For example, if the DI 1300 is set to a value indicating the vertical direction CSI-RS, the UE generates $CQI_{HV}$ in consideration of A⊗B. The UE uses the precoding matrix indicated by the most recently transmitted $PMI_V$ to obtain the precoding matrix B. From the viewpoint of $CQI_{HV}$, DI indicates the direction corresponding to the precoding matrix to be updated in generating CQI. The UE uses the precoding matrix indicated by PMI transmitted newly in correspondence to the direction indicated by DI and, for the other direction, the precoding matrix indicated by the most recently transmitted in correspondence to the corresponding direction. This concept is also applicable to DI 1320, $PMI_H$ 1335, and $CQI_{HV}$ 1330 in the same manner.

For another example, the DI 1340 indicates the vertical direction CSI-RS, and the UE generates $CQI_{HV}$ 1350 using A⊗B. The UE uses the precoding matrix indicated by $PMI_V$ 1355 transmitted in subsequence to the DI 1340 to obtain the precoding matrix B. The UE uses the precoding matrix indicated by the mostly recently transmitted $PMI_H$ 1335 to obtain the precoding matrix A.

Figure 14:
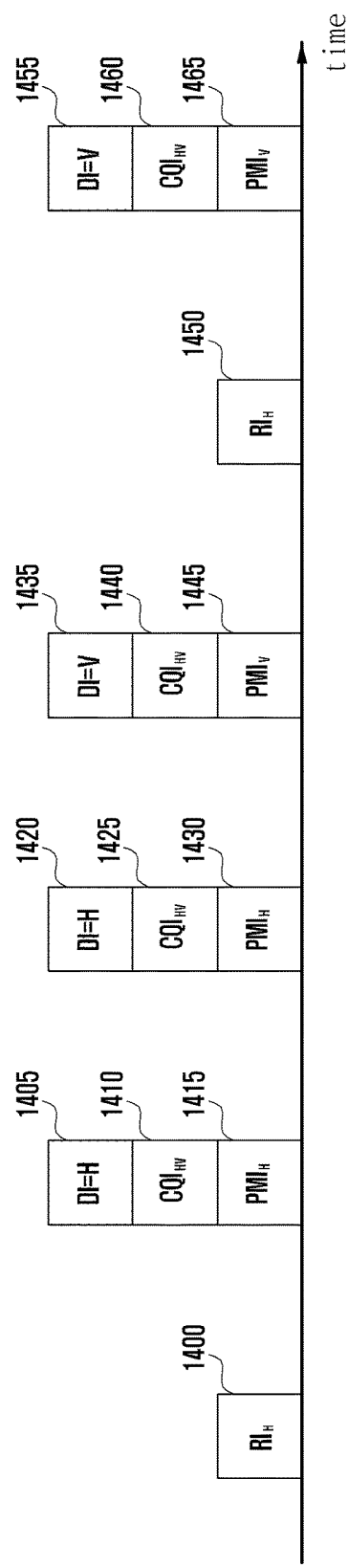
FIG. 14 illustrates the transmission of CSI according to another embodiment of the present invention.

FIG. 14 illustrates the transmission of CSI according to another embodiment of the present invention.

Referring to FIG. 14, among the horizontal and vertical RIs, the horizontal RI, i.e. $RI_H$ 1400 and $RI_H$ 1450 are transmitted. That is the vertical rank is fixed to 1 always. According to an alternative embodiment, only the vertical direction rank indicator may be transmitted while the horizontal direction rank indicator is fixed to 1.

In FIG. 14, the UE transmits DI at the PMI and CQI transmission occasion, and the PMI is as one of $PMI_H$ and $PMI_V$ depending on whether the DI indicates the horizontal CSI-RS or horizontal CSI-RS. The UE transmits $CQI_{HV}$ generated in consideration of both the horizontal and vertical CSI-RSs.

When the DIs 1405 and 1420 indicate the horizontal direction CSI-RS, the horizontal precoding matrix indicators $PMI_H$ 1415 and 1425 are transmitted. The UE also uses the precoding matrix indicated by $PMI_H$ 1415 and 1430 transmitted newly in correspondence to the CSI-RS indicated by the DI to calculate $CQI_{HV}$ 1410 and 1425. The UE uses the precoding matrix indicated by the most recently transmitted $PMI_V$ in correspondence to the other direction CSI-RS.

This concept is similarly applicable to DI 1435 and 1455, $CQI_{HV}$ 1440 and 1460, and $PMI_V$ 1445 and 1465.

Figure 15:
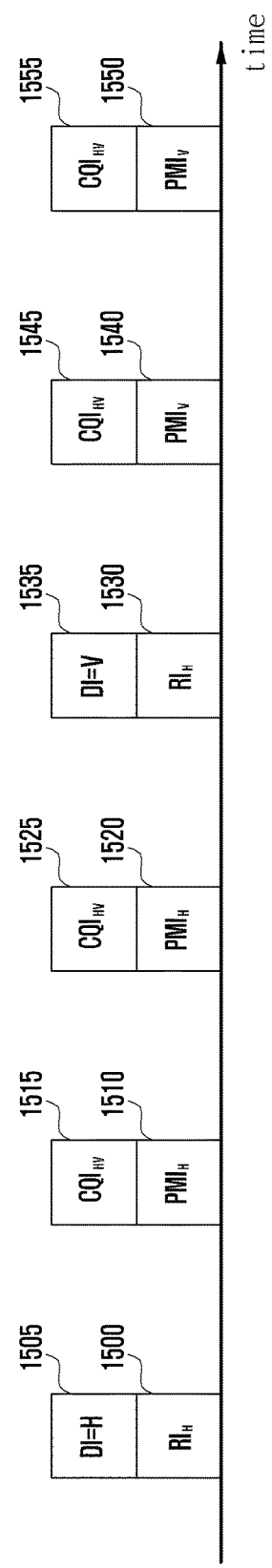
FIG. 15 illustrates the transmission of CSI according to another embodiment of the present invention.

FIG. 15 illustrates the transmission of CSI according to another embodiment of the present invention. Specifically, FIG. 15 applies the DI concept to the embodiment illustrated in FIG. 9. FIG. 15 differs from FIG. 14 in that the DI is transmitted at an RI transmission occasion instead of a PMI and CQI transmission occasion.

Referring to FIG. 15, the $RI_H$ 1500 and the $RI_H$ 1530 are transmitted in correspondence to only the horizontal direction CSI-RSs. Accordingly, the RI corresponding to the vertical direction CSI-RS is fixed to 1. This method of fixing the vertical direction rank to 1 is advantageous for acquiring vertical direction beamforming gain and horizontal direction spatial multiplexing gain. According to an alternative embodiment, it is possible to transmit only the vertical direction rank indicator while fixing the horizontal rank to 1.

In FIG. 15, the UE transmits DI and then PMI corresponding to the DI, i.e., $PMI_H$ or $PMI_V$. Upon receipt of DI, the eNB also processes the PMI following the DI under the assumption that the PMI is $PMI_H$ or $PMI_V$.

DI 1505 indicates the horizontal direction CSI-RS is transmitted, and the $PMI_H$ 1510 and 1520 indicate the horizontal direction precoding until another DI 1535 is transmitted. When calculating the $CQI_{HV}$ 1515 and the $CQI_{HV}$ 1525, the UE uses the precoding matrix indicated by $PMI_H$ 1510 and 1520 transmitted newly in correspondence to the CSI-RS indicated by the DI. For the other direction precoding matrix, the UE uses the precoding matrix indicated by most recently transmitted PMI in correspondence to the corresponding other direction CSI-RS.

In FIG. 15, the RI transmitted with DI at the same time may be fixed to one of the vertical and horizontal directions, regardless of the DI. That is, the RI always indicates the horizontal direction rank, regardless of the value of DI. When the RI indicates specific directional information, the DI indicating different direction CSI-RS may cause a problem. In this case, the UE notifies the eNB that the horizontal direction RI is changed using $RI_H$ 1530. However, because DI 1535 indicates the vertical direction CSI-RS, the eNB is not notified of the horizontal direction precoding information with $PMI_V$ 1540. In order to overcome this problem, two approaches are considered.

Approach 1: When only the horizontal direction RI is transmitted, if the DI indicates the vertical direction CSI-RS, the UE sets the corresponding RI to the value of the previously transmitted RI without change. That is, if the DI indicates the horizontal direction CSI-RS as DI 1535, the UE transmits the $RI_H$ 1530 equal to the previous $RI_H$ 1500 to the eNB. The UE also determines $CQI_{HV}$ 1545 and 1555 under an assumption that the $PMI_V$ 1540 and 1550 and the most recently transmitted $PMI_H$ 1520 indicate the same precoding matrix.

Approach 2: When only the horizontal direction RI is transmitted, the UE transmits the horizontal PMI and CQI at PMI/CQI transmission timing, after the RI transmission timing. That is, although the UE configures DI indicating vertical direction CSI-RS, it transmits the horizontal direction PMI and CQI first and then the vertical direction PMI and CQI afterward. This prevents the $PMI_V$ from being transmitted right after the RI in order to solve the aforementioned problem.

In accordance with an embodiment of the present invention, a method is provided for the UE to efficiently report the CSI to the eNB using a plurality of transmit antennas, such as in FD-MIMO. In order to use such CSI, the eNB should configure the CSI feedback to the UE. That is, the UE has to have the capability of determining whether to report the CSI to the eNB in a conventional method or to measure a plurality of CSI-RSs and report the information, such as $CQI_{HV}$ (which is not supported in the conventional method), using the new methods illustrated in FIGS. 8 and 9.

In accordance with an embodiment of the present invention, a method is provided for the UE to make such a determination based on the CSI process configuration. As described above, the CSI process specified in the conventional technology consists of one CSI-RS and one IMR. In order to generate the CSI based on a plurality of CSI-RSs, as illustrated in FIGS. 8 and 9, however, the CSI process includes a plurality of CSI-RSs and one IMR. By taking notice that plural CSI-RSs is configured for each CSI process to support this new CSI report method, the UE determines whether to apply the new CSI report method depending on the number of CSI-RSs included in the CSI process, without extra control information from the eNB. The methods for determining the CSI report scheme are summarized as follows.

1. Apply the new CSI report scheme, when the number of CSI-RSs included in the CSI process is greater than or equal to 2.

2. Apply the legacy CSI report scheme, when the number of CSI-RSs included in the CSI process is 1.

The CSI report scheme based on the number of CSI-RSs included the CSI process is summarized by the UE measuring one CSI-RS to report the corresponding CQI, when the number of CSI-RSs included in the CSI-RS process is 1, and the UE measuring two CSI-RSs to report $CQI_{HV}$, when the number of CSI-RSs included in the CSI-RS process is 2.

Figure 16:
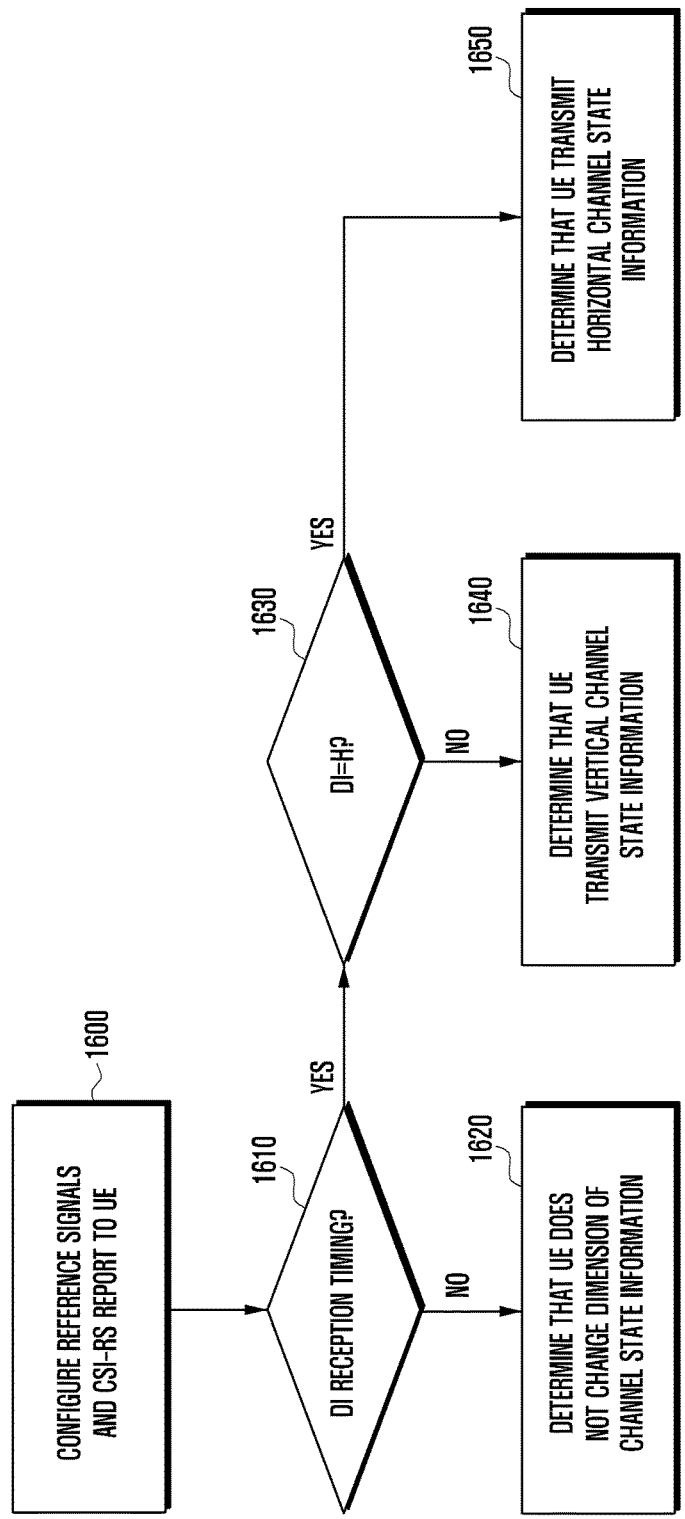
FIG. 16 is flowchart illustrating an enhanced Node B (eNB) procedure for receiving CSI according to an embodiment of the present invention.

FIG. 16 is flowchart illustrating an eNB procedure for receiving CSI according to an embodiment of the present invention.

Referring to FIG. 16, the eNB checks the number and 2-dimensional arrangement state of the transmit antennas of the FD-MIMO transmitter in step 1600. The eNB determines, based on the check result, the configuration of the $CSI-RS_H$ and $CSI-RS_V$. Although various embodiments of the present disclosure have proposed the $CSI-RS_H$ and $CSI-RS_V$ configurations, other types of first and second CSI-RSs may be configured in alternative embodiments. The $CSI-RS_H$ and $CSI-RS_V$ configuration is notified to the UE through higher layer signaling or in another method. The eNB also notifies the UE of the CSI feedback configuration in which the UE feeds back the CSI corresponding to $CSI-RS_H$ and $CSI-RS_V$. This configuration is transmitted from the eNB to the UE through higher layer signaling. Alternatively, the CSI feedback configuration may be provided to the UE in another method.

If the UE transmits the CSI according to the configuration, the eNB determines whether it is a DI reception timing in step 1610. If it is not the DI reception timing, the eNB determines that the UE is transmitting the CSI generated based on the previously indicated CSI-RS in step 1620. However, if it is the DI reception timing in step 1610, the eNB receives the DI and determines whether the DI indicates the horizontal direction CSI-RS or the vertical direction CSI-RS in step 1630. If the DI indicates the horizontal direction CSI-RS, the eNB performs control operations, such as scheduling on the UE under an assumption of the horizontal direction CSI in step 1650. However, if the DI indicates the vertical direction CSI-RS, the eNB performs control operations, such as scheduling on the UE under an assumption of the vertical direction CSI in step 1640. Such CSI reception at operations 1640 and 1650 is maintained until new DI is received.

Figure 17:
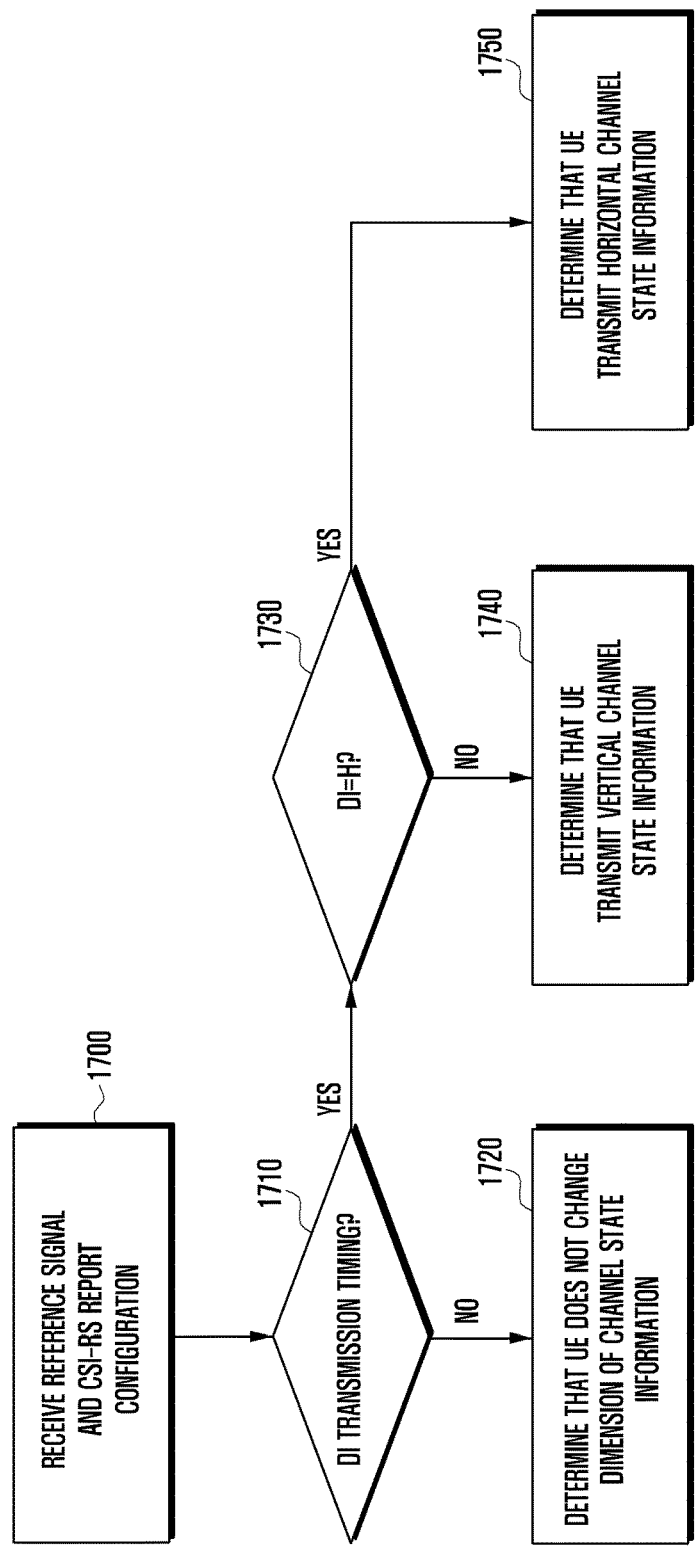
FIG. 17 is a flowchart illustrating a UE procedure for transmitting CSI according to an embodiment of the present invention.

FIG. 17 is a flowchart illustrating a UE procedure for transmitting CSI according to an embodiment of the present invention.

Referring to FIG. 17, in step 1700, the UE receives the control information associated with the measurement of a plurality of CSI-RSs for an FD-MIMO system from the eNB. That is, the UE receives the information on how to receive the $CSI-RS_H$ and $CSI-RS_V$ transmitted by the eNB. Although various embodiments of the present disclosure have proposed the $CSI-RS_H$ and $CSI-RS_V$ configurations, other types of first and second CSI-RSs may also be configured. The UE also receives the CSI feedback configuration indicating how the UE should feed back the CSI corresponding to $CSI-RS_H$ and $CSI-RS_V$. This configuration is transmitted from the eNB to the UE through higher layer signaling. Alternatively, the CSI feedback configuration may be provided to the UE in another method. The UE transmits the CSI according to the CSI feedback configuration.

In step 1710, the UE determines whether it is a DI transmission timing. If it is not DI transmission timing in step 1710, the UE transmits the CSI generated based on the previously indicated CSI-RS in step 1720. However, if it is the DI transmission timing in step 1710, the UE transmits the DI indicating the horizontal or vertical direction CSI-RS corresponding to the CSI in step 1730. For example, the UE determines the CSI-RS for use in generating the CSI according to the change in its movement or the recent channel state and transmits the DI corresponding to the determined CSI-RS to the eNB. If the DI is set to indicate the horizontal direction CSI-RS, the UE transmits the horizontal direction CSI in step 1750. However, if the DI is set to indicate the vertical direction CSI-RS, the UE transmits the vertical direction CSI in step 1740. The CSI transmission step 1740 and 1750 are maintained until a new DI is transmitted. Detailed examples of CSI generation and transmission methods have been provided above with reference to FIGS. 5 to 15.

Although FIGS. 16 and 17 illustrate the eNB transmitting CSI-RS and CSI feedback configuration explicitly, the present invention may be embodied in such a way that the eNB notifies the UE of at least one of CSI-RS transmission position of the eNB, number of CSI-RSs, and number of ports per CSI-RS, and the UE generates and transmits the CSI according to a feedback configuration predetermined based on the received information. It is sufficient for the eNB to provide the UE with the information necessary for determining the CSI generation and transmission method.

Figure 18:
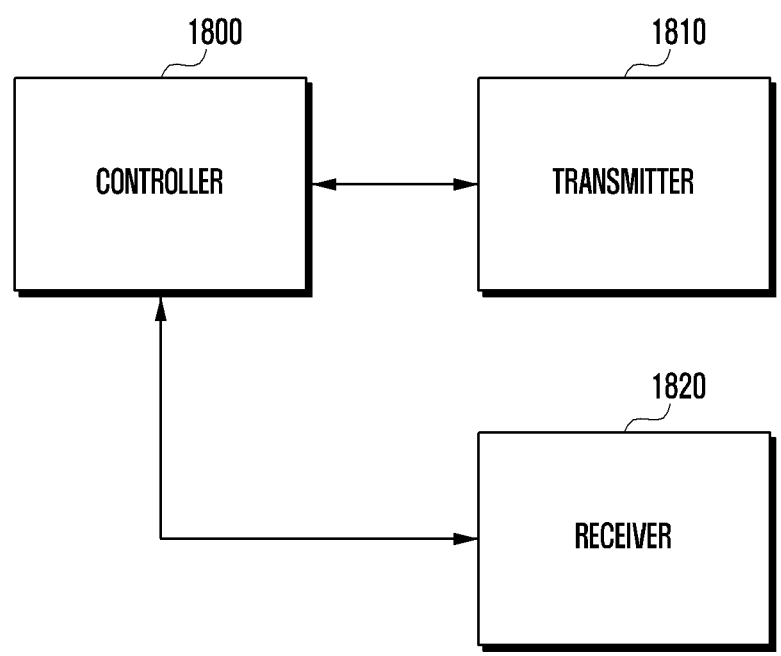
FIG. 18 is a block diagram illustrating an eNB according to an embodiment of the present invention.

FIG. 18 is a block diagram illustrating an eNB according to an embodiment of the present invention.

Referring to FIG. 18, the eNB includes a controller 1800, a transmitter 1810, and a receiver 1820. The controller 1800, e.g., a microprocessor, determines the configuration on the plurality of CSI-RSs. The controller 1800 may determine the CSI-RS transmission scheme and the corresponding CSI generation and feedback scheme. The transmitter 1810 transmits the determination result to the UE. The transmitter 1810 transmits the plurality of CSI-RSs to the UE. The receiver 1820 receives the CSI corresponding to the CSI-RSs from the UE. Examples of the eNB procedure for receiving CSI have been described above with reference to FIGS. 5 to 17.

Particularly, the controller 1800 receives the CSI at the CSI indicator (e.g., DI) reception timing and, afterward, assumes that the CSI received before the receipt of a new CSI indicator corresponds to the CSI-RS indicated by the CSI indicator and uses the CSI for scheduling.

Figure 19:
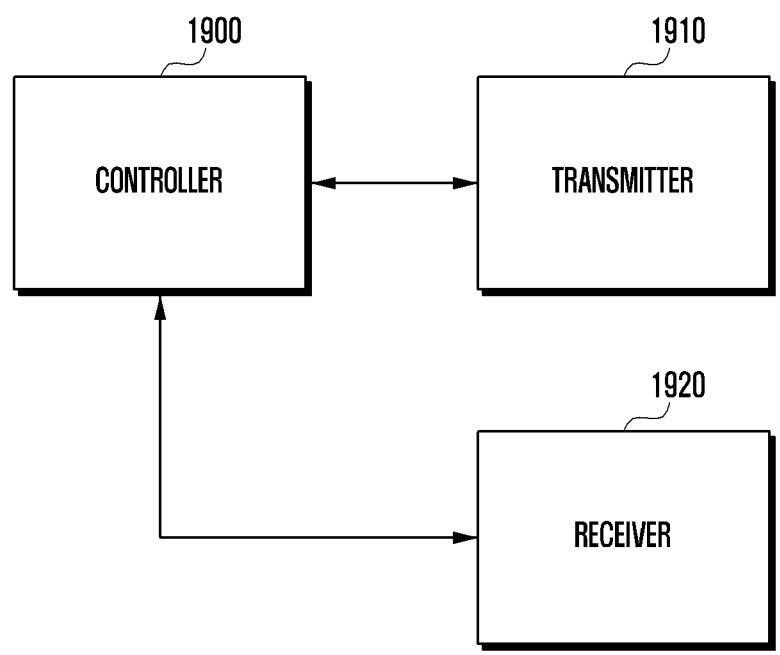
FIG. 19 is a block diagram illustrating a UE according to an embodiment of the present invention.

FIG. 19 is a block diagram illustrating a UE according to an embodiment of the present invention.

Referring to FIG. 19, the UE includes a controller 1900, a transmitted 1910, and a receiver 1920. The receiver 1920 receives the configuration information on a plurality of CSI-RSs and a CSI generation and feedback scheme. The controller 1900 controls the receiver 1920 to receive the plurality of CSI-RSs transmitted by the eNB. The controller 1900 generates CSI based on the plurality of CSI-RSs and controls the transmitter 1910 to transmit the CSI to the eNB. Examples of UE procedures for transmitting CSI have been described above with reference to FIGS. 5 to 17.

Particularly, the controller 1900 transmits the CSI at the CSI (e.g., DI) transmission timing and, afterward, transmits the CSI corresponding to the CSI-RS indicated by the CSI indicator until the transmission of a new CSI indicator.

In accordance with the above-described embodiments of the present invention, the CSI transmission and reception methods are capable of efficiently transmitting the CSI in the system using a plurality of antennas.

Herein, it will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, implement functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A channel state information (CSI) transmission method of a terminal, the method comprising:
receiving a first CSI reference signal (CSI-RS) and a second CSI-RS;
transmitting a CSI indicator at a first timing, wherein the CSI indicator indicates one CSI-RS among the first CSI-RS and the second CSI-RS; and
reporting a channel quality indicator (CQI) at a second timing which is different than the first timing, the CQI being generated based on the one CSI-RS indicated by the transmitted CSI indicator,
wherein a reporting period of the CSI indicator is an integer multiple of at least one among a period of the CQI and a period of a precoding matrix indicator (PMI) generated based on the one CSI-RS indicated by the transmitted CSI indicator.

2. The method of claim 1, wherein the CSI indicator is transmitted with a rank indicator.

3. The method of claim 1, wherein the CQI is reported until transmission of a new CSI indicator.

4. The method of claim 1, wherein the first and second CSI-RSs are transmitted by a two-dimensional antenna array.

5. The method of claim 4, wherein the CSI indicator is a dimension indicator indicating one of first dimension-grouped antenna ports and second dimension-grouped antenna ports.

6. The method of claim 5, wherein the dimension indicator indicates which one of the first dimension grouped antenna ports and the second dimension grouped antenna ports correspond to the PMI.

7. A terminal for transmitting channel state information (CSI), the terminal comprising:
a receiver;
a transmitter; and
a controller configured to:
control the receiver to receive a first CSI reference signal (CSI-RS) and a second CSI-RS,
control the transmitter to transmit a CSI indicator at a first timing, wherein the CSI indicator indicates one CSI-RS among the first CSI-RS and the second CSI-RS, and
control the transmitter to report a channel quality indicator (CQI) at a second timing which is different than the first timing, the CQI being generated based on the one CSI-RS indicated by the transmitted CSI indicator,
wherein a reporting period of the CSI indicator is an integer multiple of at least one among a period of the CQI and a period of a precoding matrix indicator (PMI) generated based on the one CSI-RS indicated by the transmitted CSI indicator.

8. The terminal of claim 7, wherein the CSI indicator is transmitted with a rank indicator.

9. The terminal of claim 7, wherein the CQI is reported until transmission of a new CSI indicator.

10. A channel state information (CSI) reception method of a base station (BS), the method comprising:
- transmitting a first CSI reference signal (CSI-RS) and a second CSI-RS;
- receiving a CSI indicator at a first timing, wherein the CSI indicator indicates one CSI-RS among the first CSI-RS and the second CSI-RS; and
- receiving a channel quality indicator (CQI) at a second timing which is different than the first timing, the CQI being generated based on the one CSI-RS indicated by the received CSI indicator,
- wherein a reporting period of the CSI indicator is an integer multiple of at least one among a period of the CQI and a period of a precoding matrix indicator (PMI) generated based on the one CSI-RS indicated by the transmitted CSI indicator.

11. The method of claim 10, wherein the CSI indicator is received with a rank indicator.

12. The method of claim 10, wherein the CQI is received until receipt of a new CSI indicator.

13. A base station (BS) for receiving channel state information (CSI), the BS comprising:
- a transmitter;
- a receiver; and
- a controller configured to:
  - control the transmitter to transmit a first CSI reference signal (CSI-RS) and a second CSI-RS,
  - control the receiver to receive a CSI indicator at a first timing, wherein the CSI indicator indicates one CSI-RS among the first CSI-RS and the second CSI-RS, and
  - control the receiver to receive a channel quality indicator (CQI) at a second timing which is different than the first timing, the CQI being generated based on the one CSI-RS indicated by the received CSI indicator,
- wherein a reporting period of the CSI indicator is an integer multiple of at least one among a period of the CQI and a period of a precoding matrix indicator (PMI) generated based on the one CSI-RS indicated by the transmitted CSI indicator.

14. The BS of claim 13, wherein the CSI indicator is received with a rank indicator.

15. The BS of claim 13, wherein the CQI is received until receipt of a new CSI indicator.

* * * * *